United States Patent
Huang et al.

(10) Patent No.: US 12,132,885 B2
(45) Date of Patent: Oct. 29, 2024

(54) MULTIPLE INTER PREDICTORS WITH DECODER SIDE MOTION VECTOR DERIVATION FOR VIDEO CODING

(71) Applicant: QUALCOMM Incorporated, San Diego, CA (US)

(72) Inventors: Han Huang, San Diego, CA (US); Yan Zhang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/823,714

(22) Filed: Aug. 31, 2022

(65) Prior Publication Data

US 2023/0079743 A1    Mar. 16, 2023

Related U.S. Application Data

(60) Provisional application No. 63/245,077, filed on Sep. 16, 2021.

(51) Int. Cl.
| | |
|---|---|
| *H04N 19/105* | (2014.01) |
| *H04N 19/159* | (2014.01) |
| *H04N 19/176* | (2014.01) |
| *H04N 19/70* | (2014.01) |

(52) U.S. Cl.
CPC ......... *H04N 19/105* (2014.11); *H04N 19/159* (2014.11); *H04N 19/176* (2014.11); *H04N 19/70* (2014.11)

(58) Field of Classification Search
CPC ............................. H04N 19/105; H04N 19/159
See application file for complete search history.

(56) References Cited

U.S. PATENT DOCUMENTS

| | | | | |
|---|---|---|---|---|
| 10,701,366 | B2* | 6/2020 | Chen | H04N 19/44 |
| 10,986,343 | B2* | 4/2021 | Yu | H04N 19/176 |
| 11,172,196 | B2* | 11/2021 | Zhang | H04N 19/513 |
| 11,509,929 | B2* | 11/2022 | Liu | H04N 19/159 |
| 11,523,104 | B2* | 12/2022 | Wang | H04N 19/577 |
| 11,533,490 | B2* | 12/2022 | Yu | H04N 19/137 |
| 11,641,483 | B2* | 5/2023 | Zhang | H04N 19/132 |
| | | | | 375/240.16 |

(Continued)

FOREIGN PATENT DOCUMENTS

WO    2020163837 A1    8/2020

OTHER PUBLICATIONS

Bross B., et al., "Versatile Video Coding (Draft 10)", 19, JVET Meeting, Jun. 22, 2020-Jul. 1, 2020, Teleconference, (The Joint Video Exploration Team of ISO/IEC JTC1/SC29/WG11 and ITU-T SG.16), No. JVET-S2001-vH, Sep. 4, 2020, XP030289618, 548 Pages.

(Continued)

*Primary Examiner* — Irfan Habib
(74) *Attorney, Agent, or Firm* — Shumaker & Sieffert, PA

(57) ABSTRACT

A method of decoding video data may comprise determining merge candidates for a block of video data and determining if a merge candidate of the merge candidates includes an additional inter prediction signal. If a merge candidate includes an additional inter prediction signal, the method may include disabling at least one decoder side motion vector derivation technique for use on a base prediction signal of the block of video data.

20 Claims, 13 Drawing Sheets

EXTENDED CU REGION IN BDOF

(56) References Cited

U.S. PATENT DOCUMENTS

| | | | | |
|---|---|---|---|---|
| 11,736,698 | B2* | 8/2023 | Liu | H04N 19/523 |
| | | | | 375/240.02 |
| 11,770,540 | B2* | 9/2023 | Zhang | H04N 19/184 |
| | | | | 375/240.12 |
| 11,870,974 | B2* | 1/2024 | Zhang | H04N 19/537 |
| 11,895,302 | B2* | 2/2024 | Huang | H04N 19/105 |
| 11,909,951 | B2* | 2/2024 | Zhang | H04N 19/82 |
| 2018/0242024 | A1* | 8/2018 | Chen | H04N 19/159 |
| 2019/0230350 | A1* | 7/2019 | Chen | H04N 19/105 |
| 2019/0320180 | A1* | 10/2019 | Yu | H04N 19/109 |
| 2020/0120339 | A1* | 4/2020 | Chiang | H04N 19/105 |
| 2020/0137416 | A1* | 4/2020 | Esenlik | H04N 19/513 |
| 2020/0221117 | A1* | 7/2020 | Liu | H04N 19/56 |
| 2020/0228815 | A1 | 7/2020 | Xu et al. | |
| 2021/0014484 | A1* | 1/2021 | Kotra | H04N 19/159 |
| 2021/0037238 | A1* | 2/2021 | Park | H04N 19/105 |
| 2021/0144400 | A1* | 5/2021 | Liu | H04N 19/70 |
| 2021/0227225 | A1* | 7/2021 | Yu | H04N 19/137 |
| 2021/0297673 | A1* | 9/2021 | Zhang | H04N 19/186 |
| 2021/0306661 | A1* | 9/2021 | Ahn | H04N 19/109 |
| 2021/0329287 | A1* | 10/2021 | Chiang | H04N 19/573 |
| 2021/0392337 | A1* | 12/2021 | Lim | H04N 19/109 |
| 2021/0392367 | A1* | 12/2021 | Zhang | H04N 19/139 |
| 2021/0400261 | A1* | 12/2021 | Chen | H04N 19/159 |
| 2022/0078407 | A1* | 3/2022 | Zhao | H04N 19/176 |
| 2022/0086441 | A1* | 3/2022 | Zhang | H04N 19/176 |
| 2022/0116594 | A1* | 4/2022 | Park | H04N 19/176 |
| 2022/0167001 | A1* | 5/2022 | Zhang | H04N 19/176 |
| 2022/0272375 | A1* | 8/2022 | Xiu | H04N 19/159 |
| 2022/0360793 | A1* | 11/2022 | Winken | H04N 19/57 |
| 2022/0417522 | A1* | 12/2022 | Huang | H04N 19/513 |
| 2023/0079743 | A1* | 3/2023 | Huang | H04N 19/573 |
| | | | | 375/240.02 |
| 2023/0209042 | A1* | 6/2023 | Chiang | H04N 19/147 |
| | | | | 375/240.02 |
| 2023/0209048 | A1* | 6/2023 | Chiang | H04N 19/11 |
| | | | | 375/240.02 |
| 2023/0209060 | A1* | 6/2023 | Chiang | H04N 19/105 |
| | | | | 375/240.02 |
| 2023/0298216 | A1* | 9/2023 | Zhang | G06V 20/20 |

OTHER PUBLICATIONS

Chen J., et al., "Algorithm Description for Versatile Video Coding and Test Model 10 (VTM 10) ", 19, JVET Meeting, Jun. 22, 2020-Jul. 1, 2020, Teleconference, (The Joint Video Exploration Team of ISO/IEC JTC1/SC29/WG11 and ITU-T SG.16), No. JVET-S2002-V1, Oct. 10, 2020, XP030302176, pp. 1-97, JVET-S2002-V2.

Coban M., et al., "Algorithm Description of Enhanced Compression Model 2 (ECM 2)", 23rd, MPEG Meeting, Jul. 7, 2021-Jul. 16, 2021, Online, (Motion Picture Expert Group or ISO/IEC JTC1/SC29/WG11), No. M57745, JVET-W2025, Sep. 1, 2021, XP030297803, pp. 1-22.

Gao H., et al., "Decoder-Side Motion Vector Refinement in VVC: Algorithm and Hardware Implementation Considerations", IEEE Transactions on Circuits and Systems for Video Technology, IEEE, USA, vol. 31, No. 8, Nov. 9, 2020, XP011870333, pp. 3197-3211.

Huang (Qualcomm) H., et al., "CE9-related: Disabled DMVR, BDOF and BCW for CIIP", 15, JVET Meeting, Jul. 3, 2019-Jul. 12, 2019, Gothenburg, (The Joint Video Exploration Team of ISO/IEC JTC1/SC29/WG11 and ITU-TSG.16), No. JVET-O0681, Jul. 1, 2019, XP030220234, 11 Pages.

Huang (Qualcomm) H., et al., "EE2-Related: Complexity Reduction for Decoder Side Motion Derivation", 24, MPEG Meeting, Oct. 11, 2021-Oct. 15, 2021, Online, (Motion Picture Expert Group or ISO/IEC JTC1/SC29/WG11), No. m57849, JVET-X0056-V1, Sep. 30, 2021, XP030297652, pp. 1-2.

International Search Report and Written Opinion—PCT/US2022/075830—ISA/EPO—Dec. 16, 2022.

Chang Y-J., et al., "Compression Efficiency Methods Beyond VVC", 21. JVET Meeting, Jan. 6, 2021-Jan. 15, 2021, by teleconference, (The Joint Video Exploration Team of ISO/IEC JTC1/SC29/WG11 and ITU-T SG.16), No. JVET-U0100, Dec. 31, 2020, 13 Pages, XP030293237.

Chang Y-J., et al., (Qualcomm): "EE2: Tests of Compression Efficiency Methods Beyond VVC", 22. JVET Meeting, Apr. 20, 2021-Apr. 28, 2021, Teleconference, (The Joint Video Exploration Team of ISO/IEC JTC1/SC29/WG11 and ITU-T SG.16 WP 3), No. JVET-V0120-V2, m56535, Apr. 22, 2021, pp. 1-31, XP030294307.

"ITU-T H.265, Series H: Audiovisual and Multimedia Systems, Infrastructure of Audiovisual Services—Coding of Moving Video, High Efficiency Video Coding", The International Telecommunication Union, Apr. 2015, 634 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Su Y-C., et al, "CE4-related: Generalized Bi-prediction Improvements Combined from JVET-L0197 and JVET-L0296", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0646-v5, pp. 1-6.

Winken M., et al., "CE10: Multi-Hypothesis Inter Prediction (Test 10.1.2)", JVET-M0425-v2, Joint Video Experts Team (JVET) of ITU-T SG 16 WP 3 and ISO/IEC JTC 1/SC 29/WG 11, 13th Meeting: Marrakech, MA, Jan. 9-18, 2019, MARRAKECH, (The Joint Video Exploration Team of ISO/IEC JTC1/SC29/WG11 and ITU-TSG.16), No. JVET-M0425 Jan. 2019 (Jan. 7, 2019), pp. 1-14, XP030200865.

Winken M., et al., "CE10: Multi-Hypothesis Inter Prediction (Tests 1.2.a—1.2.c)", JVET-L0148-v3, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-12.

Winken M., et al., "CE10: Multi-Hypothesis Inter Prediction (Tests 1.5—1.8)", JVET-K0269-v1, Joint Video Experts Team (JVET) of ITU-T SG 16 WP 3 and ISO/IEC JTC 1/SC 29/WG 11, 11th Meeting: Ljubljana, SI, Jul. 10-18, 2018, pp. 1-14.

Winken M., et al., "Multi-Hypothesis Inter Prediction", JVET-J0041-v2, Joint Video Experts Team (JVET) of ITU-T SG 16 WP 3 and ISO/IEC JTC 1/SC 29/WG 11, 10th Meeting: San Diego, US, Apr. 10-20, 2018, pp. 1-10.

* cited by examiner

MULTIPLE INTER PREDICTORS WITH DECODER SIDE MOTION VECTOR DERIVATION FOR VIDEO CODING

This application claims the benefit of U.S. patent application Ser. No. 63/245,077 filed on Sep. 16, 2021, and titled "MULTIPLE HYPOTHESIS PREDICTION FOR DECODER SIDE MOTION VECTOR DERIVATION FOR VIDEO CODING", the entire contents of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs), and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to inter prediction in video codecs. More specifically, this disclosure describes devices and methods related to decoder side motion vector derivation techniques and techniques with multiple inter prediction signals (predictors) such as multiple hypothesis prediction (MHP).

In example video coding techniques, bilateral-matching based decoder side motion vector refinement (DMVR) is applied to increase the accuracy of motion vectors of a bi-prediction merge candidate. When DMVR and MHP are combined together, the computational complexity increases significantly. This disclosure describes techniques relating to the usage of decoder side motion vector derivation techniques (e.g., DMVR, bi-directional optical flow (BDOF), multi-pass DMVR) together with MHP. The techniques of this disclosure may reduce the complexity of the implementation of MHP with decoder side motion derivation, with minimal effect on coding performance (e.g., distortion).

In general, a video coder may be configured to determine if a merge candidate for a block of video data includes a base prediction signal and an additional inter prediction signal (e.g., an additional hypothesis as generated by MHP). The additional inter prediction signal may be inherited or may be signaled in the bitstream. If the merge candidate for the block of video data includes an additional inter prediction signal, the video coder may be configured to disable a decoder side motion vector derivation technique for use when determining an overall prediction signal for the block. The decoder side motion vector derivation techniques may include DMVR, multi-pass DMVR, BDOF, or other decoder side motion vector derivation techniques.

In one example, this disclosure describes a method of coding video data, the method comprising determining merge candidates for a block of video data, determining if a merge candidate of the merge candidates includes an additional inter prediction signal, and disabling at least one decoder side motion vector derivation technique for use on a base prediction signal of the block of video data in response to determining that the merge candidate includes an additional inter prediction signal.

In another example, a device for decoding or encoding includes a memory, and one or more processors configured to determine merge candidates for a block of video data, determine if a merge candidate of the merge candidates includes an additional inter prediction signal, and disable at least one decoder side motion vector derivation technique for use on a base prediction signal of the block of video data in response to a determination that a merge candidate includes an additional inter prediction signal.

In another example, a device for decoding or encoding includes means for determining merge candidates for a block of video data, means for determining if a merge candidate of the merge candidates includes an additional inter prediction signal, and means for disabling at least one decoder side motion vector derivation technique for use on a base prediction signal of the block of video data in response to determining that the merge candidate includes an additional inter prediction signal.

In another example, this disclosure describes a non-transitory computer-readable storage medium storing instructions that, when executed, cause one or more processors to determine merge candidates for a block of video data, determine if a merge candidate of the merge candidates includes an additional inter prediction signal, and disable at least one decoder side motion vector derivation technique for use on a base prediction signal of the block of video data in response to a determination that a merge candidate includes an additional inter prediction signal.

The details of one or more examples are set forth in the accompanying drawings and the description below. Other features, objects, and advantages will be apparent from the description, drawings, and claims.

DETAILED DESCRIPTION

In video coding, various decoder side motion vector derivation techniques, such as decoder side motion vector refinement (DMVR), bi-directional optical flow, or the like, may be applied to blocks to increase the accuracy of motion vectors in a merge mode. Other techniques for video coding, such as multiple hypothesis prediction (MHP), may also be used to predict motion vectors. For example, when DMVR and MHP are combined together, the computational complexity increases significantly. This disclosure describes techniques relating to the usage of decoder side motion vector derivation techniques (e.g., DMVR, bi-directional optical flow (BDOF), multi-pass DMVR) together with techniques that include multiple inter prediction signals. The techniques of this disclosure may reduce the implementation complexity of video coding when using multiple inter prediction signals with decoder side motion vector derivation, with minimal effect on coding performance (e.g., distortion).

Figure 1:
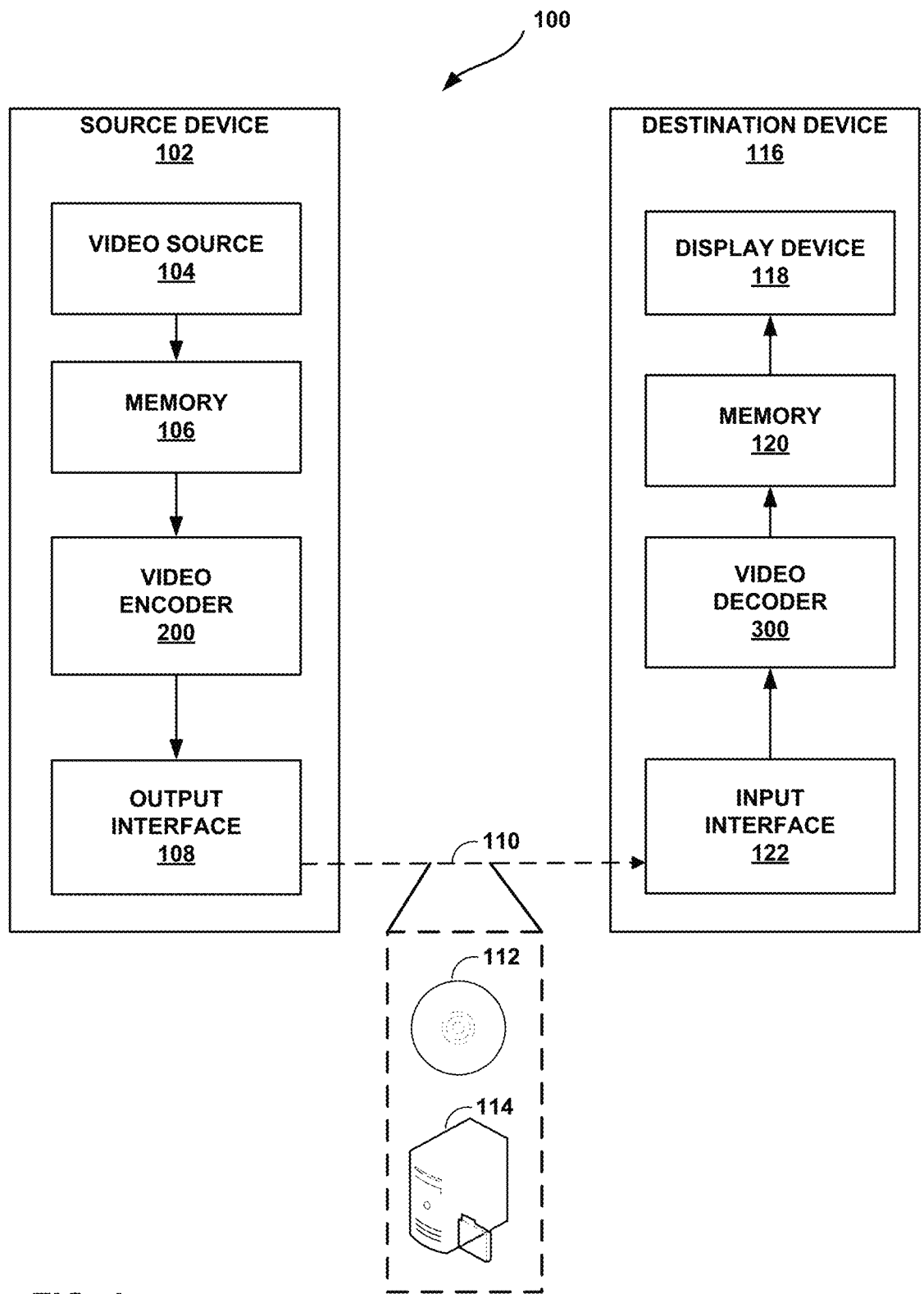
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for decoder side motion vector derivation. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for decoder side motion vector derivation. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally, or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both, which is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use decoder side motion vector derivation techniques.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an NxN block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an MxN block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "NxN" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an NxN CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise NxM samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

The techniques of this disclosure are related to inter prediction in video codecs. More specifically, this disclosure describes devices and techniques related to multiple hypothesis prediction and decoder side motion vector derivation. In accordance with the techniques of this disclosure, as will be described in more detail below, video encoder 200 and video decoder 300 may be configured to determine merge candidates for a block of video data, determine if a merge candidate of the merge candidate includes an additional hypothesis, and disable a decoder side motion vector derivation technique for use on a base prediction signal of the block of video data in response to determining that the merge candidate includes the additional hypothesis.

Inter Prediction in Versatile Video Coding Standard

For each inter-predicted CU in the Versatile Video Coding standard (VVC), motion parameters include motion vectors, reference picture indices, and reference picture list usage index, as well as any additional information needed for new coding feature of VVCs, are used for inter-predicted sample generation. The motion parameters can be signalled in an explicit or implicit manner. When a CU is coded with skip mode, the CU is associated with one PU and has no significant residual coefficients, no coded motion vector delta, or reference picture index. A merge mode is specified whereby the motion parameters for the current CU are obtained from neighboring CUs, including spatial and temporal candidates, as well as additional schedules introduced in VVC. The merge mode can be applied to any inter-predicted CU, not only for skip mode. The alternative to merge mode is the explicit transmission of motion parameters, where a motion vector (e.g., a motion vector difference), a corresponding reference picture index for each reference picture list, and a reference picture list usage flag and other needed information are signalled explicitly for each CU.

Beyond the inter coding features in HEVC, VVC includes a number of new and refined inter prediction coding tools listed as follows:

Extended merge prediction
Merge mode with MVD (MMVD)
Symmetric MVD (SMVD) signalling
Affine motion compensated prediction
Subblock-based temporal motion vector prediction (SbTMVP)
Adaptive motion vector resolution (AMVR)
Motion field storage: $1/16^{th}$ luma sample MV storage and 8×8 motion field compression
Bi-prediction with CU-level weight (BCW)
Bi-directional optical flow (BDOF)
Decoder side motion vector refinement (DMVR)
Geometric partitioning mode (GPM)
Combined inter and intra prediction (CIIP)

Extended Merge Prediction

In VVC regular merge mode, the merge candidate list is constructed by including the following five types of candidates, in order:
1) Spatial motion vector predictor (MVP) from spatial neighbour CUs;
2) Temporal MVP from collocated CUs;
3) History-based MVP from a first-in, first-out (FIFO) table;
4) Pairwise average MVP; and
5) Zero motion vectors (MVs).

The size of the merge list is signalled in a sequence parameter set (SPS) header. In one example, the maximum allowed size of the merge list is 6 candidates. For each CU coded in merge mode, an index of the selected merge candidate is encoded using truncated unary binarization (TU).

The derivation process of each category of merge candidates is provided in this section. As is done in HEVC, VVC also supports parallel derivation of the merging candidate lists for all CUs within a certain size of area.

Spatial Candidates Derivation

Figure 2:
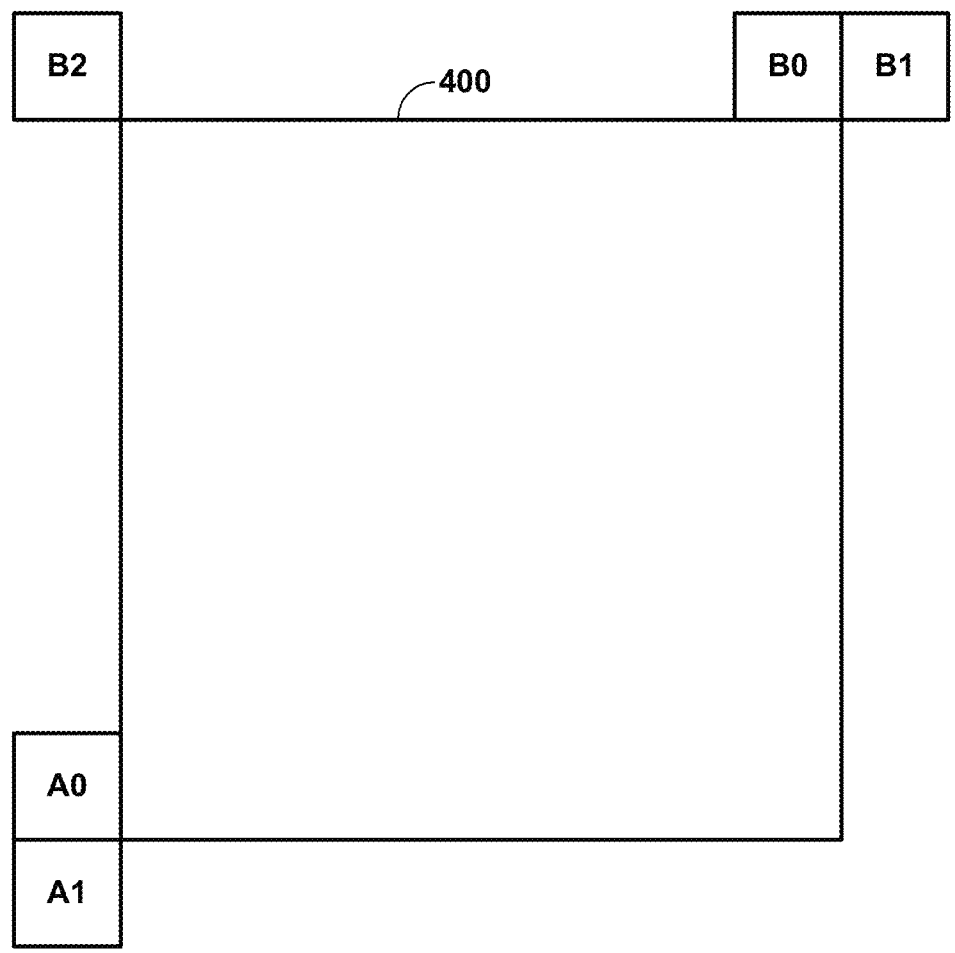
FIG. 2 illustrates example positions of spatial merge candidates.

The derivation of spatial merge candidates in VVC is the as that in HEVC, except the positions of first two merge candidates are swapped. FIG. 2 illustrates example positions of spatial merge candidates relative to block 400 (e.g., a CU). A maximum of four merge candidates are selected among candidates located in the positions depicted in FIG. 2. The order of derivation is: $B_0$, A0, B1, A1 and $B_2$. Position $B_2$ is considered only when one or more the CUs at positions $B_0$, $A_0$, B1, $A_1$ are not available (e.g., because the CU belongs to another slice or tile) or the CU is intra coded. After candidate at position Ai is added, the addition of the remaining candidates is subject to a redundancy check which ensures that candidates with same motion information are excluded from the list so that coding efficiency is improved.

Temporal Candidates Derivation

Figure 3:
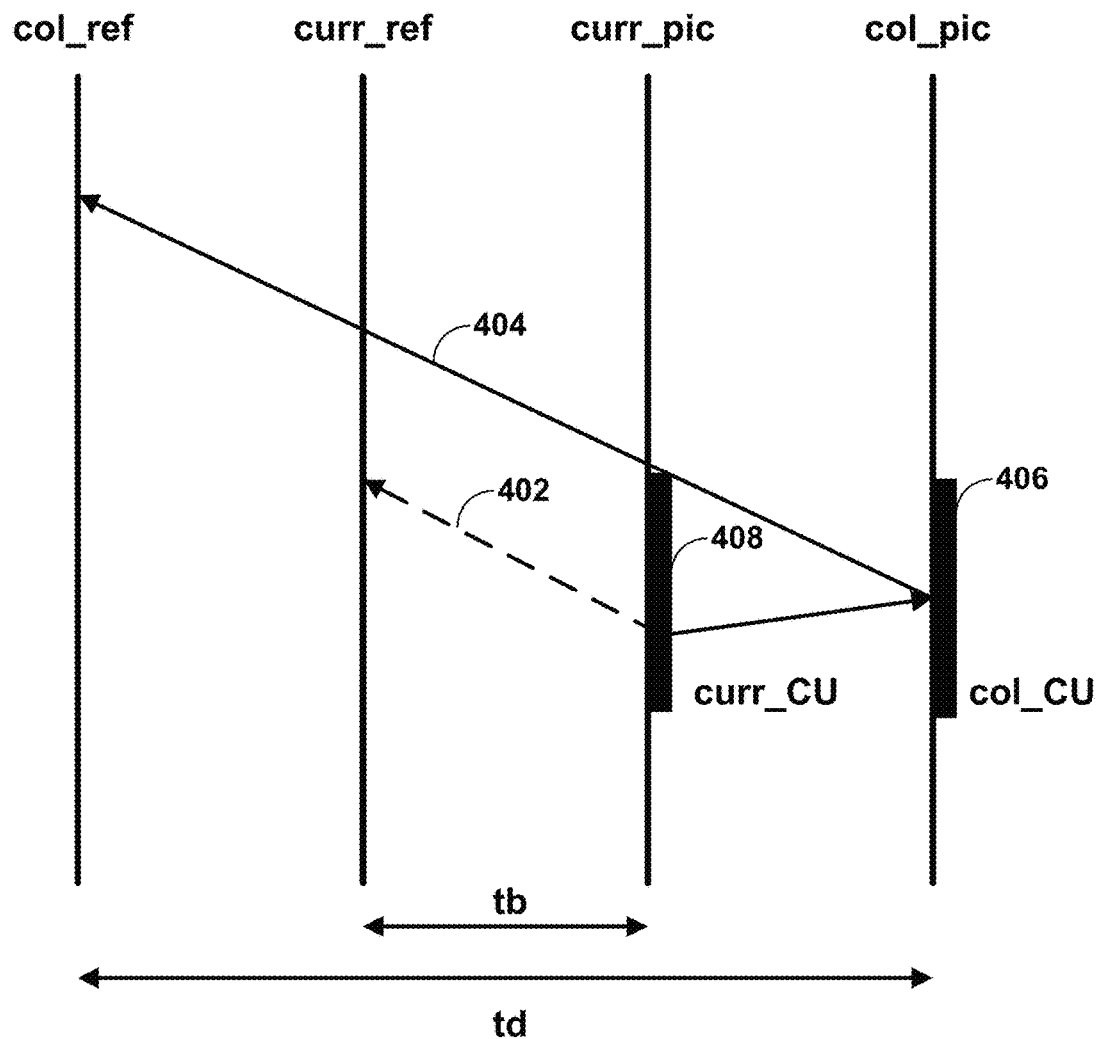
FIG. 3 illustrates an example of motion vector scaling for a temporal merge candidate.

In this technique, only one candidate is added to the list. Particularly, in the derivation of this temporal merge candidate, a scaled motion vector is derived based on co-located CU belonging to the collocated reference picture. FIG. 3 illustrates an example of motion vector scaling for a temporal merge candidate. The reference picture list to be used for derivation of the co-located CU is explicitly signaled in the slice header. The scaled motion vector 402 for the temporal merge candidate of the current CU (curr_CU) 408 is obtained as illustrated by the dotted line in FIG. 3, which is scaled from the motion vector 404 of the co-located CU (col_CU) 406 using the picture order count (POC) distances, tb and td, where tb is defined to be the POC difference between the reference picture of the current picture (curr_ref) and the current picture (curr_ref) and td is defined to be the POC difference between the reference picture of the co-located picture (col_ref) and the co-located picture (col_pic). The reference picture index of temporal merge candidate is set equal to zero.

Figure 4:
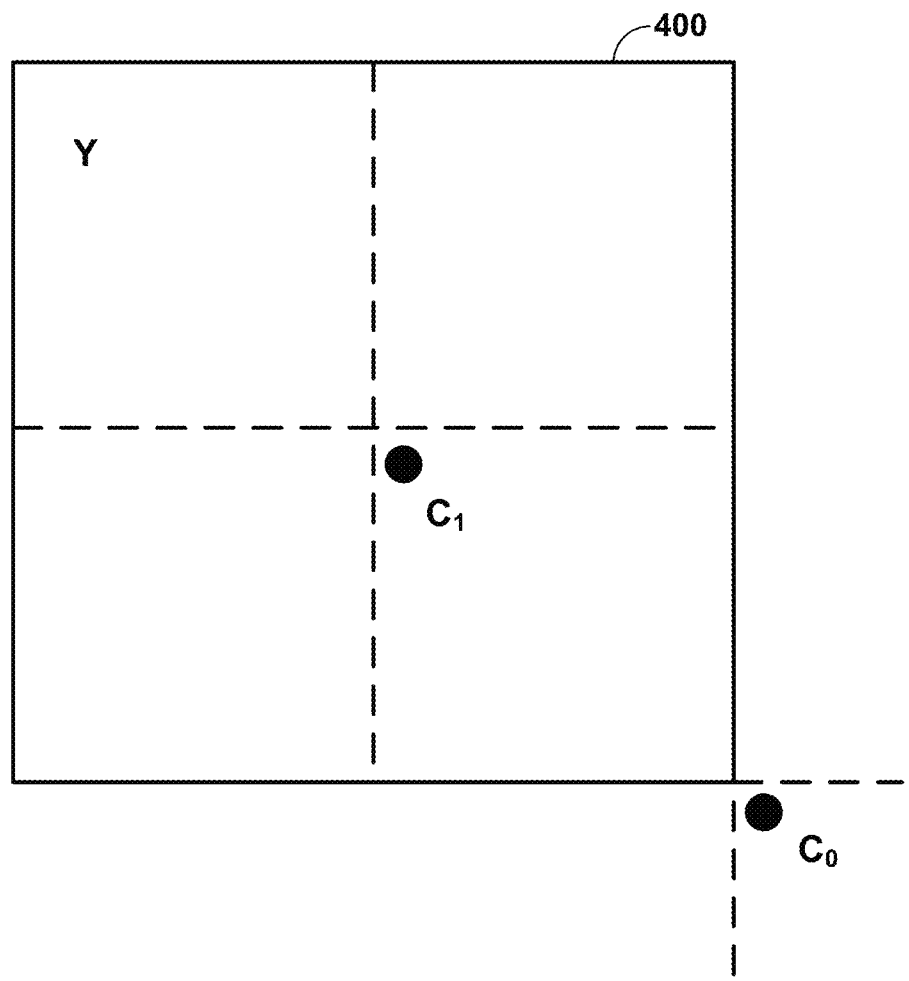
FIG. 4 illustrates example candidate positions for temporal merge candidates.

FIG. 4 illustrates example candidate positions for temporal merge candidates for block 400. The position for the temporal candidate is selected between candidates $C_0$ and $C_1$, as depicted in FIG. 4. If the CU at position $C_0$ is not available (e.g., is intra coded or is outside of the current row of CTUs), position $C_1$ is used. Otherwise, position $C_0$ is used in the derivation of the temporal merge candidate.

History-Based Merge Candidates Derivation

The history-based MVP (HMVP) merge candidates are added to the merge list after the spatial merge candidates (e.g., spatial MVP) and the temporal merge candidate (e.g., temporal MVP or TMVP). In HMVP, the motion information of a previously coded block is stored in a table and used as MVP for the current CU. The table with multiple HMVP candidates is maintained during the encoding/decoding process. The table is reset (e.g., emptied) when a new CTU row is encountered. Whenever there is a non-subblock inter-coded CU, the associated motion information is added to the last entry of the table as a new HMVP candidate.

The HMVP table size S is set to be 6, which indicates up to 6 HMVP candidates may be added to the table. When inserting a new motion candidate to the table, a constrained first-in-first-out (FIFO) rule is utilized, wherein a redundancy check is firstly applied to find whether there is an identical HMVP in the table. If found, the identical HMVP is removed from the table and all the HMVP candidates afterwards are moved forward.

HMVP candidates could be used in the merge candidate list construction process. The latest several HMVP candidates in the table are checked in order and inserted to the candidate list after the TMVP candidate. A redundancy check is applied on the HMVP candidates to compare the motion information of the HMVP candidate to the spatial or temporal merge candidate.

To reduce the number of redundancy check operations, the following simplifications are introduced:
a. The number of HMVP candidates used for merge list generation is set as (N<=4)?M:(8−N), wherein N indicates number of existing candidates in the merge list and M indicates number of available HMVP candidates in the table.

b. Once the total number of available merge candidates reaches the maximum allowed merge candidates minus 1, the merge candidate list construction process from HMVP is terminated.

Pairwise Average Merge Candidate Derivation

Pairwise average candidates are generated by averaging predefined pairs of candidates in the existing merge candidate list. In one example, the predefined pairs are defined as $\{(0, 1), (0, 2), (1, 2), (0, 3), (1, 3), (2, 3)\}$, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

When the merge list is not full after pairwise average merge candidates are added, the zero MVPs are inserted in the end of the list until the maximum merge candidate number is reached.

Bi-Prediction with CU-Level Weight (BCW)

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals.

$$P_{bi-pred}=((8-w)*P_0+w*P_1+4)»3$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights ($w \in \{3,4,5\}$) are used.

At the encoder, fast search algorithms are applied to find the weight index without significantly increasing the encoder complexity. These algorithms are summarized as follows. Further details are available from the VVC Test Model (VTM) software and in Yu-Chi Su, et al. "CE4-related: Generalized bi-prediction improvements combined from JVET-L0197 and JVET-L0296," Joint Video Experts Team (WET) of ITU-T SG 16 WP 3 and ISO/IEC JTC 1/SC 29/WG 11, 12$^{th}$ Meeting: Macao, CN, 3-12 Oct. 2018 (hereinafter, "JVET-L0646"). When combined with AMVR, unequal weights are only conditionally checked for 1-pel and 4-pel motion vector precisions if the current picture is a low-delay picture.

When combined with affine motion estimation (ME), affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content.

In order to avoid interactions between WP and BCW, which will complicate VVC decoder design, if a CU uses WP, then the BCW weight index is not signalled, and w is inferred to be 4 (e.g., equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g., equal weight.

Decoder-Side Motion Vector Refinement in VVC

Figure 5:
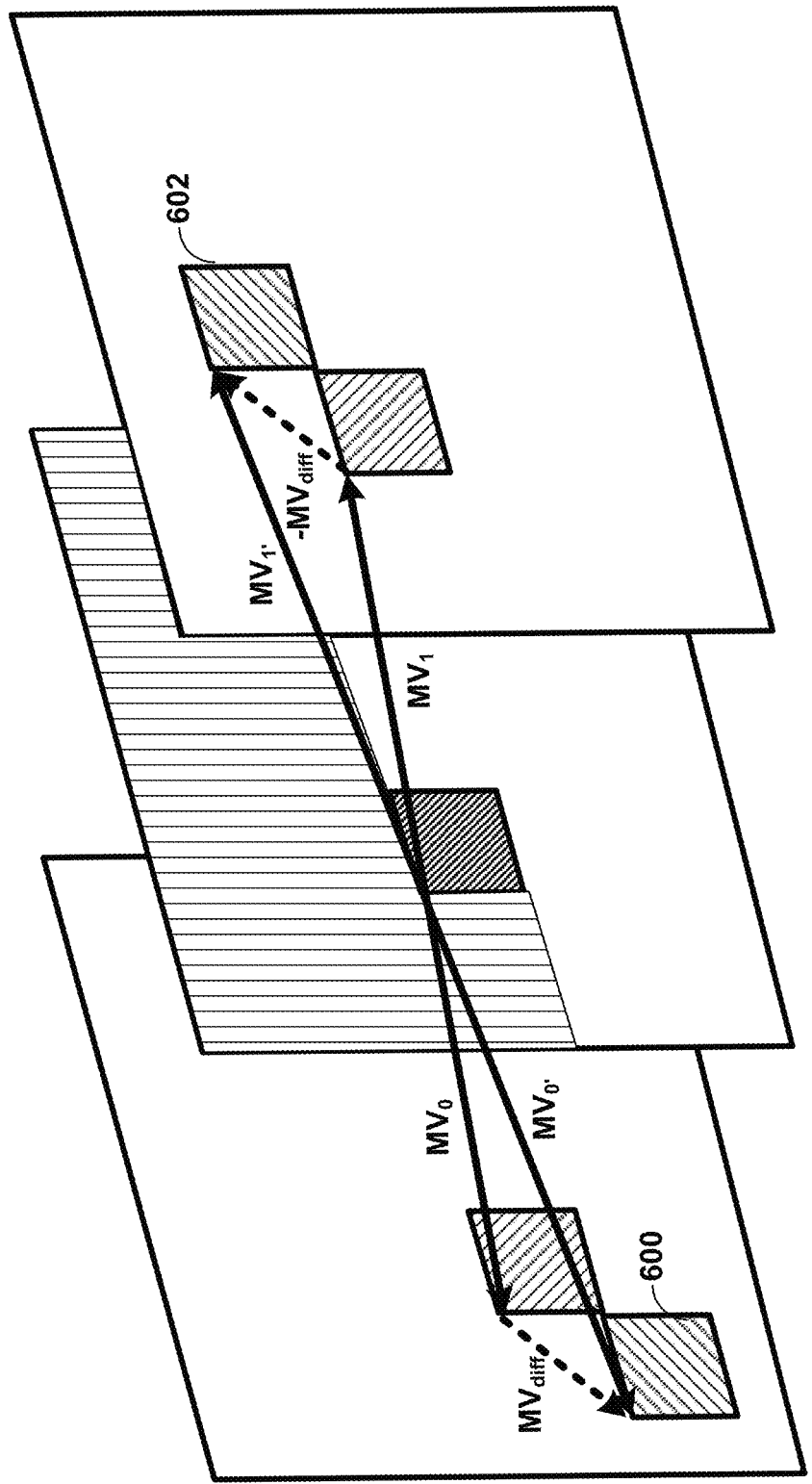
FIG. 5 illustrates an example of bilateral matching.

In the Versatile Video Coding standard (VVC), bilateral-matching (BM) based decoder side motion vector refinement (DMVR) may be applied to increase the accuracy of the MVs of a bi-prediction merge candidate. The BM method calculates the sum of absolute differences (SAD) between the two candidate blocks in the reference picture list L0 and list L1. FIG. 5 illustrates an example of bilateral matching. As illustrated in FIG. 5, the SAD between blocks 600 and 602, based on each MV candidate around the initial MV, is calculated. The MV candidate with the lowest SAD becomes the refined MV and used to generate the bi-predicted signal. The SAD of the initial MVs is subtracted by ¼ of the SAD value to serve as a regularization term. The temporal distances (e.g., the Picture Order Count (POC) difference) from two reference pictures to the current picture shall be the same, therefore, the MVD0 is just the opposite sign of MVD1.

The refinement search range is two integer luma samples from the initial MV. The searching includes the integer sample offset search stage and fractional sample refinement stage. A 25 points full search is applied for integer sample offset searching. The SAD of the initial MV pair is first calculated. If the SAD of the initial MV pair is smaller than a threshold, the integer sample stage of DMVR is terminated. Otherwise, SADs of the remaining 24 points are calculated and checked in raster scanning order. The point with the smallest SAD is selected as the output of integer sample offset searching stage.

The integer sample search is followed by fractional sample refinement. To reduce calculational complexity, the fractional sample refinement is derived by using parametric error surface equation, instead of using an additional search with a SAD comparison. The fractional sample refinement is conditionally invoked based on the output of the integer sample search stage. When the integer sample search stage is terminated with the center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$$E(x,y)=A(x-x_{min})^2+B(y-y_{min})^2+C \quad (1)$$

where $(X_{min}, Y_{min})$ corresponds to the fractional position with the least cost and C corresponds to the minimum cost value. By solving the above equations using the cost value of the five search points, the $(X_{min}, Y_{min})$ is computed as:

$$x_{min}=(E(-1,0)-E(1,0))/(2(E(-1,0)+E(1,0)-2E(0,0))) \quad (2)$$

$$Y_{min}=(E(0,-1)-E(0,1))/(2((0,-1)+E(0,1)-2E(0,0))) \quad (3)$$

The value of $x_{min}$ and $y_{min}$ are automatically constrained to be between −8 and 8 since all cost values are positive and the smallest value is E(0,0). This corresponds to half-pel offset with 1/16th-pel MV accuracy in VVC. The computed fractional $(X_{min}, Y_{min})$ are added to the integer distance refinement MV to get the sub-pixel accurate refinement delta MV.

In VVC, the resolution of the MVs is 1/16 luma samples. The samples at the fractional position are interpolated using an 8-tap interpolation filter. In DMVR, the search points surround the initial fractional-pel MV with integer sample offset. Therefore, the samples of those fractional position are interpolated for the DMVR search process. To reduce the calculation complexity, the bi-linear interpolation filter is used to generate the fractional samples for the searching process in DMVR. Another effect is that, by using a bi-linear filter with 2-sample search range, the DVMR does not access more reference samples compared to the normal motion compensation process. After the refined MV is attained with DMVR search process, the normal 8-tap interpolation filter is applied to generate the final prediction. In order to not access more reference samples relative to a normal motion compensation process, the samples which are not needed for the interpolation process based on the original MV, but are needed for the interpolation process based on the refined MV, will be padded from those available samples.

When the width and/or height of a CU are larger than 16 luma samples, the CU will be further split into subblocks with width and/or height equal to 16 luma samples for the DMVR process.

In VVC, DMVR can be applied for the CUs which are coded with following modes and features:

CU level merge mode with bi-prediction MV

One reference picture is in the past and another reference picture is in the future with respect to the current picture The distances (e.g., POC difference) from two reference pictures to the current picture are same Both reference pictures are short-term reference pictures CU has more than 64 luma samples Both CU height and CU width are larger than or equal to 8 luma samples BCW weight index indicates equal weight WP is not enabled for the current block CIIP mode is not used for the current block Bi-Directional Optical Flow Bi-directional optical flow (BDOF) is used to refine the bi-prediction signal of luma samples in a CU at the 4×4 sub-block level. As its name indicates, the BDOF mode is based on the optical flow concept, which assumes that the motion of an object is smooth. For each 4×4 sub-block, a motion refinement $(v_x, v_y)$ is calculated by minimizing the difference between the L0 and L1 prediction samples. The motion refinement is then used to adjust the bi-predicted sample values in the 4×4 sub-block. The following steps are applied in the BDOF process.

First, the horizontal and vertical gradients, $$\frac{\partial I^{(k)}}{\partial x}(i,j) \text{ and } \frac{\partial I^{(k)}}{\partial y}(i,j),$$

k=0,1, of the two prediction signals are computed by directly calculating the difference between two neighboring samples, e.g., $$\frac{\partial I^{(k)}}{\partial x}(i,j) = \left(I^{(k)}(i+1,j) \gg shift1\right) - \left(I^{(k)}(i-1,j) \gg shift1\right) \quad (1-6-1)$$

$$\frac{\partial I^{(k)}}{\partial y}(i,j) = \left(I^{(k)}(i,j+1) \gg shift1\right) - \left(I^{(k)}(i,j-1) \gg shift1\right),$$

where $I^{(k)}(i, j)$ are the sample value at coordinate (i, j) of the prediction signal in list k, k=0,1, and shift1 is calculated based on the luma bit depth, bitDepth, as shift1 is set to be equal to 6.

Then, the auto- and cross-correlation of the gradients, $S_1$, $S_2$, $S_3$, $S_5$ and $S_6$, are calculated as $$S_1 = \sum_{(i,j)\in\Omega} |\psi_x(i,j)|, S_3 = \sum_{(i,j)\in\Omega} \theta(i,j) \cdot \left(-\text{sign}(\psi_x(i,j))\right) \quad (1-6-2)$$

$$S_2 = \sum_{(i,j)\in\Omega} \psi_x(i,j) \cdot \text{sign}(\psi_y(i,j))$$

$$S_5 = \sum_{(i,j)\in\Omega} |\psi_y(i,j)| S_6 = \sum_{(i,j)\in\Omega} \theta(i,j) \cdot \left(-\text{sign}(\psi_y(i,j))\right),$$

where $$\psi_x(i,j) = \left(\frac{\partial I^{(1)}}{\partial x}(i,j) + \frac{\partial I^{(0)}}{\partial x}(i,j)\right) \gg shift3 \quad (1-6-3)$$

$$\psi_y(i,j) = \left(\frac{\partial I^{(1)}}{\partial y}(i,j) + \frac{\partial I^{(0)}}{\partial y}(i,j)\right) \gg shift3$$

$$\theta(i,j) = \left(I^{(0)}(i,j) \gg shift2\right) - \left(I^{(1)}(i,j) \gg shift2\right),$$

where $\Omega$ is a 6×6 window around the 4×4 sub-block, the value of shift2 is set to be equal to 4, and the value of shift3 is set to be equal to 1.

The motion refinement $(v_x, v_y)$ is then derived using the cross- and auto-correlation terms using the following equations:

$$v_x = S_1 > 0?\text{clips3}(-th'_{BIO}, th'_{BIO}, -((S_3 \ll 2) \gg \lfloor \log_2 S_1 \rfloor)): 0$$

$$v_y = S_5 > 0?\text{clip3}(-th'_{BIO}, th'_{BIO}, -(((S_6 \ll 2) - ((v_x \cdot S_2) \gg 1)) \gg \lfloor \log_2 S_5 \rfloor)): 0, \quad (1-6-4)$$

where, $th'_{BIO} = 1 \ll 4$. $\lfloor \cdot \rfloor$ is the floor function.

Based on the motion refinement and the gradients, the following adjustment is calculated for each sample in the 4×4 sub-block:

$$b(x, y) = \quad (1\text{-}6\text{-}5)$$
$$v_x \cdot \left( \frac{\partial I^{(1)}(x, y)}{\partial x} - \frac{\partial I^{(0)}(x, y)}{\partial x} \right) + v_y \cdot \left( \frac{\partial I^{(1)}(x, y)}{\partial y} - \frac{\partial I^{(0)}(x, y)}{\partial y} \right)$$

Finally, the BDOF samples of the CU are calculated by adjusting the bi-prediction samples as follows:

$$\text{pred}_{BDOF}(x,y) = (I^{(0)}(x,y) + I^{(1)}(x,y) + b(x,y) + o_{offset}) >> \text{shift5}, \quad (1\text{-}6\text{-}6)$$

where shift5 is set equal to Max(3, 15−BitDepth) and the variable $o_{offset}$ is set equal to (1<<(shift5−1)).

These values are selected such that the multipliers in the BDOF process do not exceed 15-bits, and the maximum bit-width of the intermediate parameters in the BDOF process is kept within 32-bits.

Figure 6:
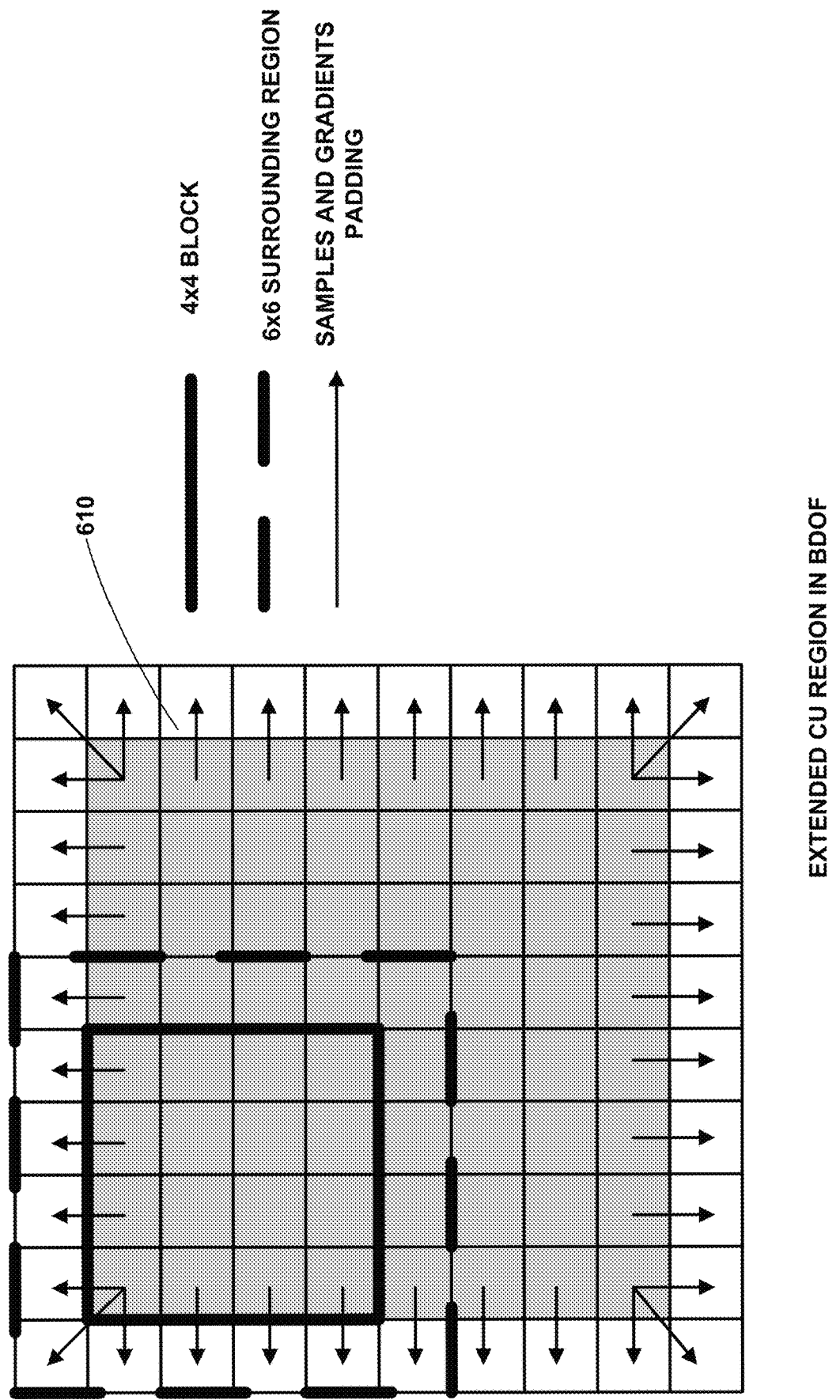
FIG. 6 illustrates an example of an extended coding unit region used in bi-directional optical flow.

In order to derive the gradient values, some prediction samples $I^{(k)}(i, j)$ in list k (k=0, 1) outside of the current CU boundaries may be generated. FIG. 6 illustrates an example of an extended coding unit region used in bi-directional optical flow. As depicted in FIG. 6, the BDOF uses one extended row/column around the boundaries of CU 610. In order to control the computational complexity of generating the out-of-boundary prediction samples, prediction samples in the extended area (white positions) are generated by taking the reference samples at the nearby integer positions (using floor( )operation on the coordinates) directly without interpolation, and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, they are padded (e.g., repeated) from their nearest neighbors.

BDOF is used to refine the bi-prediction signal of a CU at the 4×4 subblock level. BDOF is applied to a CU if it satisfies all the following conditions:

The CU is coded using "true" bi-prediction mode, i.e., one of the two reference pictures is prior to the current picture in display order and the other is after the current picture in display order The CU is not coded using affine mode or the SbTMVP merge mode CU has more than 64 luma samples Both CU height and CU width are larger than or equal to 8 luma samples BCW weight index indicates equal weight WP is not enabled for the current CU CIIP mode is not used for the current CU Multi-Pass Decoder Side Motion Refinement In the JVET-V meeting, an enhanced compression model (ECM, https://vcgit.hhi.fraunhofer.de/ecm/VVCSoftware_VTM/-/tree/ECM) was established to study the compression techniques beyond VVC. In ECM, a multi-pass decoder side motion refinement technique, described in Yao-Jen Chang, et al. "Compression efficiency beyond VVC," Joint Video Experts Team (JVET) of ITU-T SG 16 WP 3 and ISO/IEC JTC 1/SC 29/WG 11, 21$^{st}$ Meeting, by teleconference, 6-15 Jan. 2021 (hereinafter, "JVET_U0100") was adopted to replace the DMVR in VVC. In the first pass, BM (similar to that of DMVR in VVC) is applied to the coding block. In the second pass, BM is applied to each 16×16 subblock within the coding block with the refined MVs in the first pass as initial MVs. In the third pass, an MV in each 8×8 subblock is further refined by applying bi-directional optical flow (BDOF).

First Pass—Block-based Bilateral Matching MV Refinement

In the first pass, a refined MV is derived by applying BM to a coding block. Similar to decoder side motion vector refinement (DMVR), in bi-prediction operations, a refined MV is searched around the two initial MVs (MV0 and MV1) in the reference picture lists L0 and L1. The refined MVs (MV0_pass1 and MV1_pass1) are derived around the initial MVs based on the minimum bilateral matching cost between the two reference blocks in L0 and L1.

BM includes performing a local search to derive integer sample precision intDeltaMV. The local search applies a 3×3 square search pattern to loop through the search range [−sHor, sHor] in the horizontal direction and [−sVer, sVer] in the vertical direction, wherein the values of sHor and sVer are determined by the block dimension, and the maximum value of sHor and sVer is 8.

The bilateral matching cost is calculated as: bilCost=mvDistanceCost+sadCost. When the block size cbW*cbH is greater than 64, a mean-removed SAD (MR-SAD) cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of the 3×3 search pattern and the video coder continues to search for the minimum cost until the end of the search range is reached.

The existing fractional sample refinement is further applied to derive the final deltaMV. The refined MVs after the first pass is then derived as:

$$MV0\_pass1 = MV0 + \text{delta}MV$$

$$MV1\_pass1 = MV1 - \text{delta}MV$$

Second Pass—Subblock Based Bilateral Matching MV Refinement

In the second pass, a refined MV is derived by applying BM to a 16×16 grid subblock. For each subblock, a refined MV is searched around the two MVs (MV0_pass1 and MV1_pass1), obtained on the first pass, in the reference picture list L0 and L1. The refined MVs (MV0_pass2(sbIdx2) and MV1_pass2(sbIdx2)), wherein sbIdx2=0, N−1, is the index for subblock, are derived based on the minimum bilateral matching cost between the two reference subblocks in L0 and L1.

For each subblock, BM includes performing a full search to derive integer sample precision intDeltaMV. The full search has a search range [−sHor, sHor] in horizontal direction and [−sVer, sVer] in vertical direction, wherein the values of sHor and sVer are determined by the block dimension, and the maximum value of sHor and sVer is 8.

Figure 7:
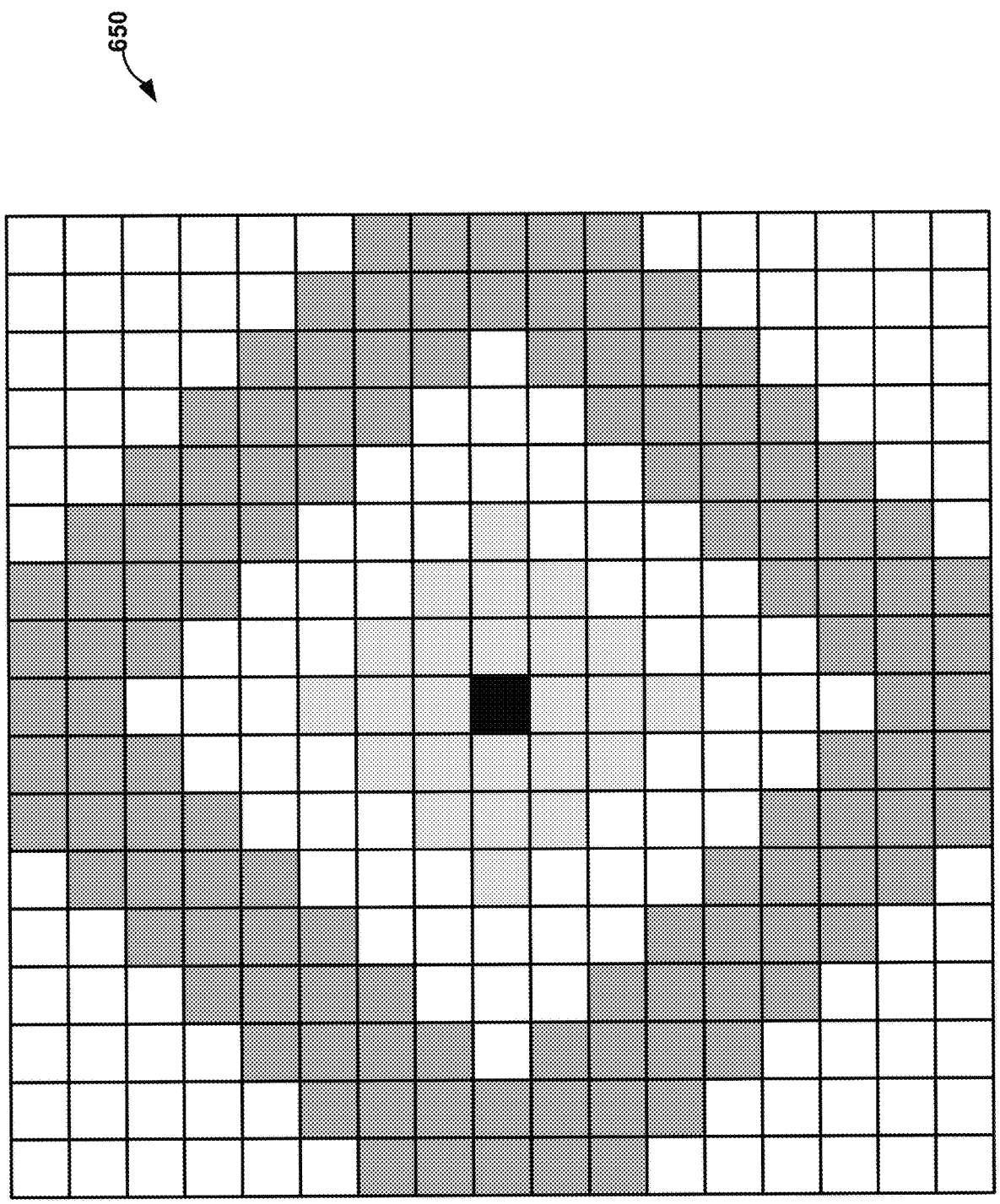
FIG. 7 illustrates an example diamond search region for multi-pass decoder side motion refinement.

The bilateral matching cost is calculated by applying a cost factor to the sum of absolute transformed differences (SATD) cost between two reference subblocks as: bilCost=satdCost*costFactor. FIG. 7 illustrates an example diamond search region 650 for multi-pass decoder side motion refinement. The search area (2*sHor+1)*(2*sVer+1) is divided into 5 diamond shaped search regions, as shown in FIG. 7. Each search region is assigned a costFactor, which is determined by the distance (intDeltaMV) between each search point and the starting MV. Each diamond region is processed in the order starting from the center of the search area. In each region, the search points are processed in the raster scan order starting from the top left going to the bottom right corner of the region. When the minimum bilCost within the current search region is less than a threshold equal to sbW*sbH, the int-pel full search is terminated. Otherwise, the int-pel full search continues to the next search region until all search points are examined.

The existing VVC DMVR fractional sample refinement is further applied to derive the final deltaMV(sbIdx2). The refined MVs at second pass is then derived as:

$$MV0\_pass2(sbIdx2)=MV0\_pass1+deltaMV(sbIdx2)$$

$$MV1\_pass2(sbIdx2)=MV1\_pass1-deltaMV(sbIdx2)$$

Third Pass—Subblock Based Bi-Directional Optical Flow MV Refinement

In the third pass, a refined MV is derived by applying BDOF to an 8×8 grid subblock. For each 8×8 subblock, BDOF refinement is applied to derive scaled Vx and Vy values, without clipping, starting from the refined MV of the parent subblock of the second pass. The derived bioMv(Vx, Vy) is rounded to 1/16 sample precision and clipped between −32 and 32.

The refined MVs (MV0_ pass3(sbldx3) and MV1_pass3(sbIdx3)) at the third pass are derived as:

$$MV0\_pass3(sbldx3)=MV0\_pass2(sbldx2)+bioMv$$

$$MV1\_pass3(sbldx3)=MV0\_pass2(sbldx2)-bioMv$$

More details of multi-pass DMVR can be found in co-pending U.S. Provisional Patent Application 63/129,221, filed Dec. 22, 2020.

Multi Hypothesis Prediction (MHP)

In many of the previous and current video coding standards, temporally predicted blocks may employ either uni or bi prediction. The multiple hypothesis prediction (MHP) was proposed in M. Winken, et. al, "Multi-Hypothesis Inter Prediction," Joint Video Experts Team (JVET) of ITU-T SG 16 WP 3 and ISO/IEC JTC 1/SC 29/WG 11, 10$^{th}$ Meeting: San Diego, US, 10-20 Apr. 2018 (hereinafter, "JVET-J0041"), and later on in M. Winken, et. al, "CE10: Multi-Hypothesis Inter Prediction (Tests 1.5-1.8)," Joint Video Experts Team (JVET) of ITU-T SG 16 WP 3 and ISO/IEC JTC 1/SC 29/WG 11, 11$^{th}$ Meeting: Ljubljana, SI, 10-18 Jul. 2018 (hereinafter, "JVET-K0269"), M. Winken, et. al, "CE10: Multi-Hypothesis Inter Prediction (Tests 1.2a-1.2c)," Joint Video Experts Team (JVET) of ITU-T SG 16 WP 3 and ISO/IEC JTC 1/SC 29/WG 11, 12$^{th}$ Meeting: Macao, CN, 3-12 Oct. 2018 (hereinafter, "JVET-L0148"), and M. Winken, et. al, "CE10: Multi-Hypothesis Inter Prediction (Test 10.1.2)," Joint Video Experts Team (JVET) of ITU-T SG 16 WP 3 and ISO/IEC JTC 1/SC 29/WG 11, 13$^{th}$ Meeting: Marrakech, MA, 9-18 Jan. 2019 (hereinafter, "JVET-M0425"). In MHP, an inter prediction method allows weighted superposition of more than two motion-compensated prediction signals. The resulting overall prediction signal is obtained by sample-wise weighted superposition. With the uni/bi prediction signal (referred to as a base prediction signal) and the first additional inter prediction signal/hypothesis $h_3$, the resulting prediction signal $p_3$ is obtained as follows:

$$p_3=(1-\alpha)p_{uni/bi}+\alpha h_3$$

The weighting factor α is specified by the syntax element add_hyp_weight_idx, according to the following mapping:

| add_hyp_weight_idx | α |
|---|---|
| 0 | 1/4 |
| 1 | −1/8 |

Analogously to the techniques described above, more than one additional prediction signal can be used. The resulting overall prediction signal is accumulated iteratively with each additional prediction signal.

$$P_{n+1}=(1-\alpha_{n+1})P_n+\alpha_{n+1}h_{n+1}$$

The resulting overall prediction signal is obtained as the last $p_n$ (i.e., the $p_n$ having the largest index n).

For inter prediction blocks using MERGE mode (but not SKIP mode), additional inter prediction signals can also be specified.

In VVC, bilateral-matching based decoder side motion vector refinement (DMVR) is applied to increase the accuracy of the MVs of a bi-prediction merge candidate. When DMVR and MHP are combined together, the computational complexity increases significantly. Similarly, when other decoder side motion vector derivation techniques are used with an inter-prediction technique that uses more than two predictors, the computational complexity is increased. This disclosure describes the following techniques relating to the usage of decoder side motion vector derivation techniques (e.g., DMVR, BDOF, multi-pass DMVR) together with any inter-prediction technique that uses more than two predictors, such as MHP. The techniques of this disclosure may reduce the complexity of the implementation of decoder side motion derivation with inter-prediction techniques that use more than two predictors, such as MHP. In the following description, the term "DMVR" will be used as representative of either DMVR in VVC or multi-pass DMVR. Some other similar bilateral matching based decoder side motion refinement techniques may also be applicable to the techniques of this disclosure.

In general, video encoder 200 and video decoder 300 may be configured to determine if a merge candidate for a block of video data includes an additional inter prediction signal such as an additional hypothesis (e.g., as generated by MHP). The additional inter prediction signal (additional hypothesis) may be inherited or may be signaled in the bitstream. If the merge candidate for the block of video data includes an additional inter prediction signal, video encoder 200 and video decoder 300 may be configured to disable a decoder side motion vector derivation technique for use when coding a base prediction signal for the block. The decoder side motion vector derivation techniques may include DMVR (e.g., as in VVC), multi-pass DMVR, BDOF, or other decoder side motion vector derivation techniques. The following description provides examples of how decoder side motion vector derivation techniques may be disabled (e.g., not allowed). Again, in the following description, the term "DMVR" will be used as representative of either DMVR in VVC or multi-pass DMVR.

In one example, if a merge candidate in the merge mode has at least one inherited additional inter prediction signal (e.g., additional hypothesis as generated by MHP), then video encoder 200 and video decoder 300 are configured to not allow (e.g., disable) DMVR to be performed on the base prediction signal regardless of whether the other DMVR conditions are met. However, the BDOF can be performed on the base prediction signal if the BDOF conditions are met.

In another example, if a merge candidate in the merge mode has at least one inherited additional inter prediction signal (e.g., additional hypothesis as generated by MHP), then video encoder 200 and video decoder 300 are configured to not allow (e.g., disable) both DMVR and BDOF to be performed on the base prediction signal regardless of whether the other DMVR and BDOF conditions are met.

In another example, if a merge candidate in the merge mode has at least one inherited additional inter prediction signal (e.g., additional hypothesis as generated by MHP), then video encoder 200 and video decoder 300 are configured to not allow (e.g., disable) BDOF to be performed on the base prediction signal regardless of whether the other BDOF conditions are met. However, the DMVR can be performed on the base prediction signal if the DMVR conditions are met.

In another example, if a merge candidate in the merge mode has at least one additional inter prediction signal signaled in the bitstream (e.g., additional hypothesis as generated by MHP), then video encoder 200 and video decoder 300 are configured to not allow (e.g., disable) DMVR to be performed on the base prediction signal regardless of whether the other DMVR conditions are met. However, the BDOF can be performed on the base prediction signal if the BDOF conditions are met.

In another example, if a merge candidate in the merge mode has at least one additional inter prediction signal signaled in the bitstream (e.g., additional hypothesis as generated by MHP), then video encoder 200 and video decoder 300 are configured to not allow (e.g., disable) both DMVR and BDOF to be performed on the base prediction signal regardless of whether the other DMVR and BDOF conditions are met.

In one example, if a merge candidate in the merge mode has at least one additional inter prediction signal signaled in the bitstream (e.g., additional hypothesis as generated by MHP), then video encoder 200 and video decoder 300 are configured to not allow (e.g., disable) BDOF to be performed on the base prediction signal regardless of whether the other BDOF conditions are met. However, the DMVR can be performed on the base prediction signal if the DMVR conditions are met.

In another example, if a merge candidate in the merge mode has at least one additional inter prediction signal (e.g., additional hypothesis as generated by MHP) either inherited from the candidate or signaled in the bitstream, then video encoder 200 and video decoder 300 are configured to not allow (e.g., disable) DMVR to be performed on the base prediction signal regardless of whether the other DMVR conditions are met. However, the BDOF can be performed on the base prediction signal if the BDOF conditions are met.

In another example, if a merge candidate in the merge mode has at least one additional inter prediction signal (e.g., additional hypothesis as generated by MHP) either inherited from the candidate or signaled in the bitstream, then video encoder 200 and video decoder 300 are configured to not allow (e.g., disable) both DMVR and BDOF to be performed on the base prediction signal regardless of whether the other DMVR and BDOF conditions are met.

In one example, if a merge candidate in the merge mode has at least one additional inter prediction signal (e.g., additional hypothesis as generated by MHP) either inherited from the candidate or signaled in the bitstream, then video encoder 200 and video decoder 300 are configured to not allow (e.g., disable) BDOF to be performed on the base prediction signal regardless of whether the other BDOF conditions are met. However, the DMVR can be performed on the base prediction signal if the DMVR conditions are met.

Figure 8:
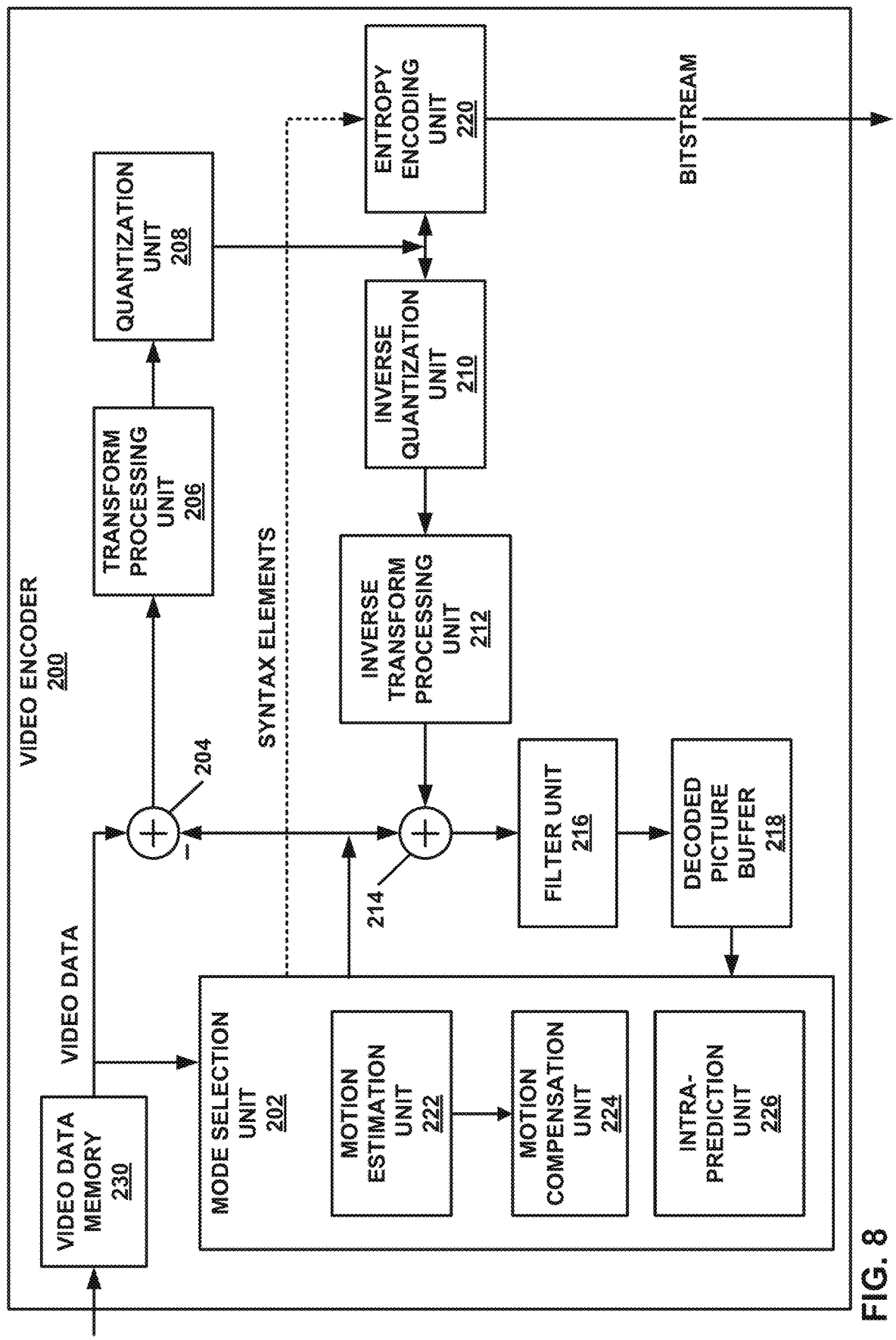
FIG. 8 is a block diagram illustrating an example video encoder that may perform the techniques of this disclosure.

FIG. 8 is a block diagram illustrating an example video encoder 200 that may perform the techniques of this disclosure. FIG. 8 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 8, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 8 are illustrated to assist with understanding the operations performed by video encoder 200. The units may be implemented as fixed-function circuits, programmable circuits, or a combination thereof.

Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may be configured to perform any of the techniques described herein for disabling decoder side motion vector derivation, including determining merge candidates for a block of video data, determining if a merge candidate of the merge candidates includes an additional inter prediction signal, and disabling at least one decoder side motion vector derivation technique for use on a base prediction signal of the block of video data in response to determining that the merge candidate includes an additional inter prediction signal.

Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit

216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine merge candidates for a block of video data, determine if a merge candidate of the merge candidate includes an additional hypothesis, and disable a decoder side motion vector derivation technique for use on a base prediction signal of the block of video data in response to determining that the merge candidate includes the additional hypothesis.

Figure 9:
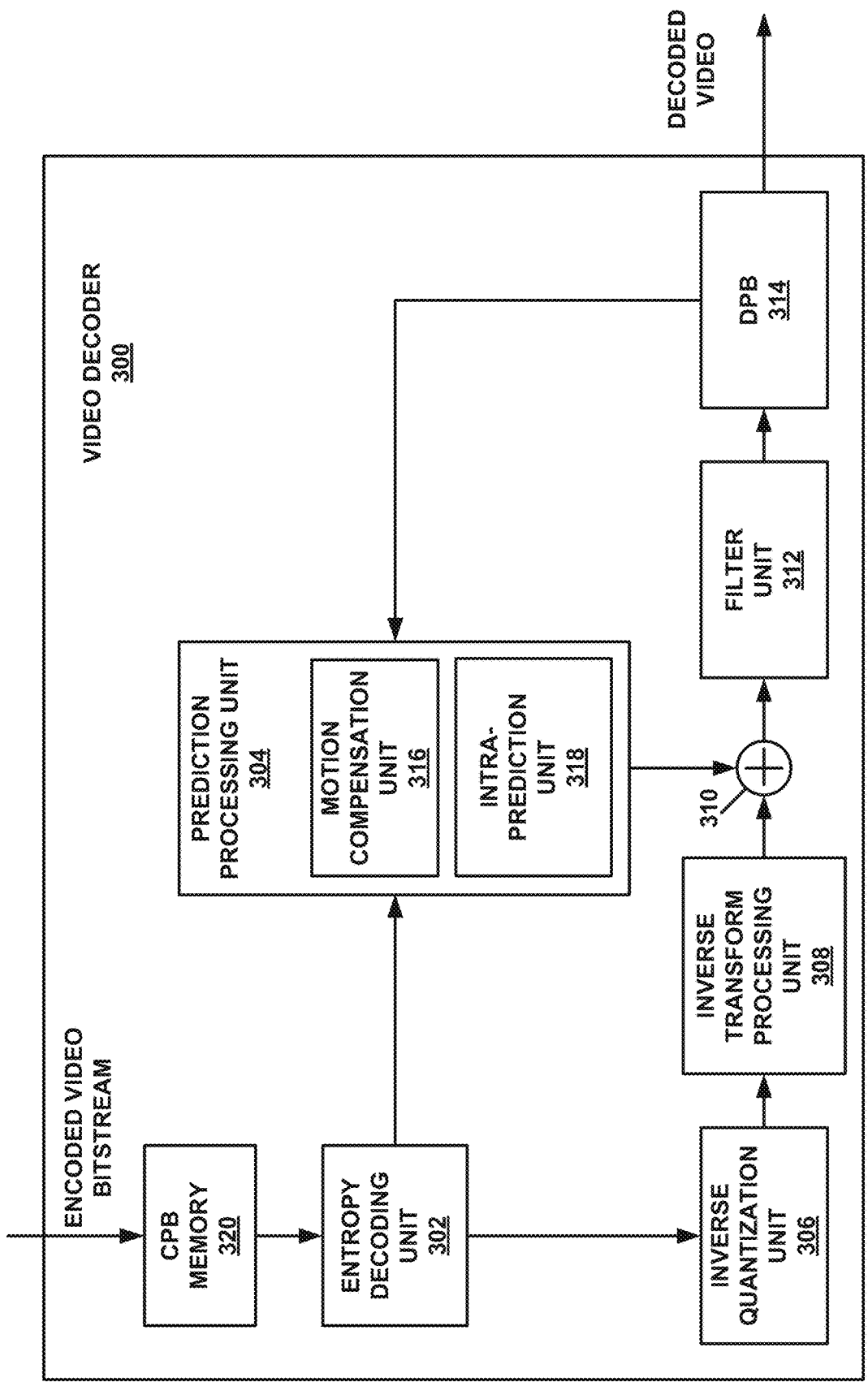
FIG. 9 is a block diagram illustrating an example video decoder that may perform the techniques of this disclosure.

FIG. 9 is a block diagram illustrating an example video decoder 300 that may perform the techniques of this disclosure. FIG. 9 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 9, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 9 are illustrated to assist with understanding the operations performed by video decoder 300. The units may be implemented as fixed-function circuits, programmable circuits, or a combination thereof. Similar to FIG. 8, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. Motion compensation unit 316 may be configured to perform any of the techniques described herein for disabling decoder side motion vector derivation, including determining merge candidates for a block of video data, determining if a merge candidate of the merge candidates includes an additional inter prediction signal, and disabling at least one decoder side motion vector derivation technique for use on a base prediction signal of the block of video data in response to determining that the merge candidate includes an additional inter prediction signal.

In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 8).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 8). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304.

Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine merge candidates for a block of video data, determine if a merge candidate of the merge candidate includes an additional hypothesis, and disable a decoder side motion vector derivation technique for use on a base prediction signal of the block of video data in response to determining that the merge candidate includes the additional hypothesis.

Figure 10:
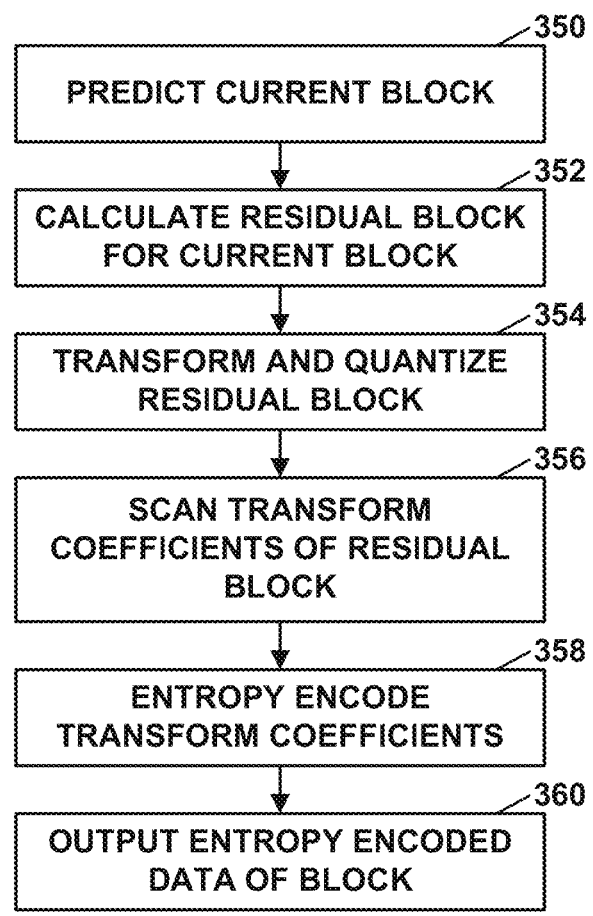
FIG. 10 is a flowchart illustrating an example method for encoding a current block in accordance with the techniques of this disclosure.

FIG. 10 is a flowchart illustrating an example method for encoding a current block in accordance with the techniques of this disclosure. The current block may comprise a current CU. Although described with respect to video encoder 200 (FIGS. 1 and 8), it should be understood that other devices may be configured to perform a method similar to that of FIG. 10.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 11:
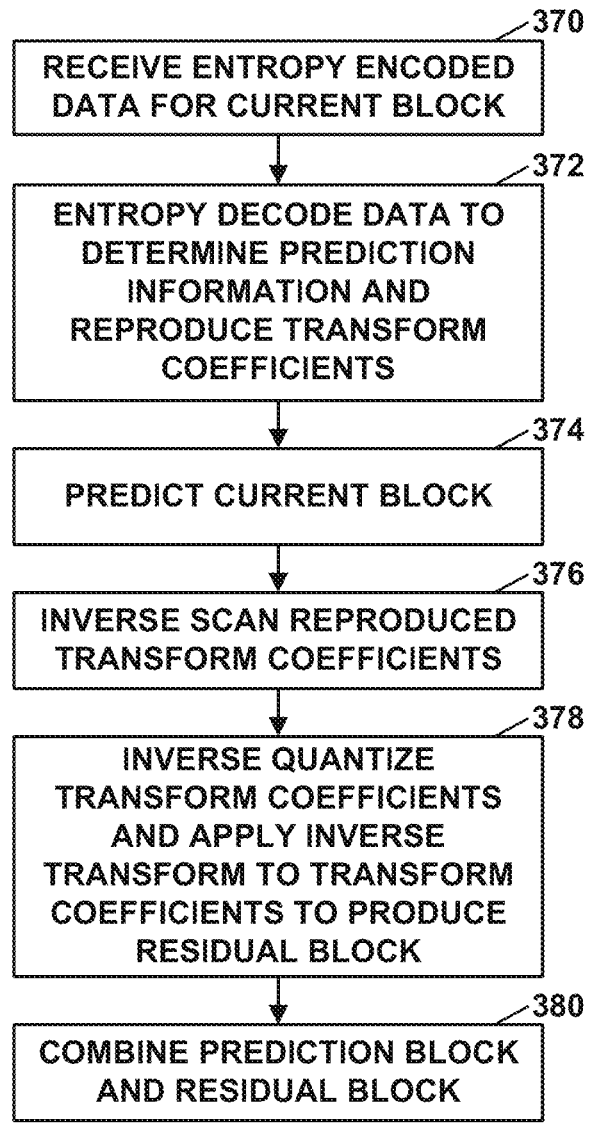
FIG. 11 is a flowchart illustrating an example method for decoding a current block in accordance with the techniques of this disclosure.

FIG. 11 is a flowchart illustrating an example method for decoding a current block of video data in accordance with the techniques of this disclosure. The current block may comprise a current CU. Although described with respect to video decoder 300 (FIGS. 1 and 9), it should be understood that other devices may be configured to perform a method similar to that of FIG. 11.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 12:
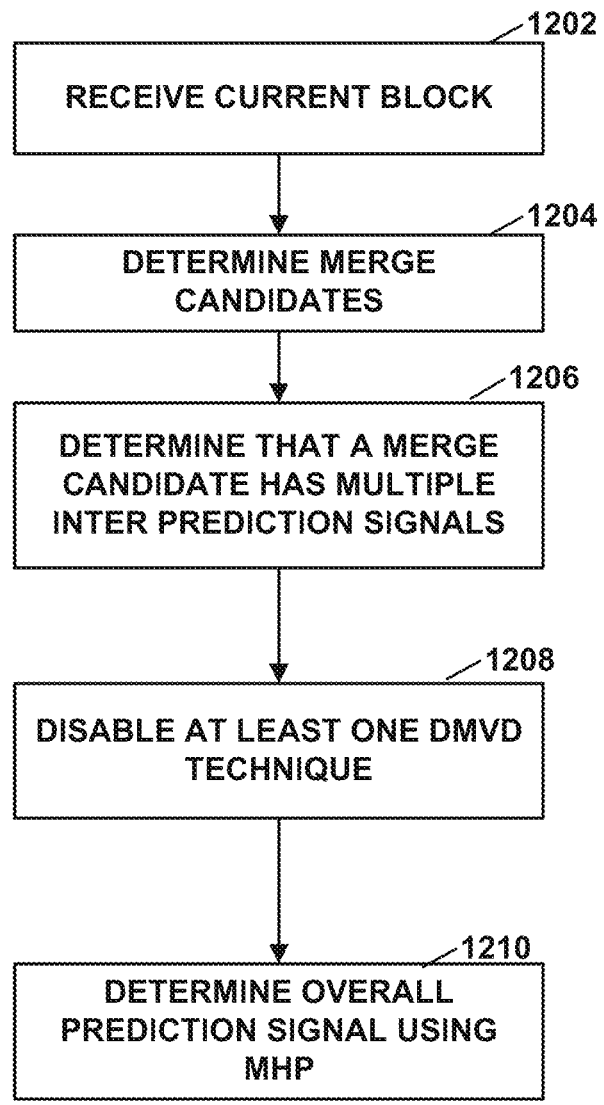
FIG. 12 is a flowchart illustrating another example method for decoding a current block in accordance with the techniques of this disclosure.

Video decoder 300 may be configured to perform the method shown in FIG. 12. In particular, at 1202, a current block of video data to be decoded is received by prediction processing unit 304. At 1204, motion compensation unit 316 determines merge candidates for the block of video data, such as by using VVC and/or MHP techniques, or the like. At 1206, motion compensation unit 316 determines if a merge candidate includes a base prediction signal and at least one additional inter prediction signal. At 1208, if at least one additional inter prediction signal exists, then at least one decoder side motion vector derivation technique is disabled for use on the base prediction signal. At 1210, motion compensation unit 316 determines an overall prediction signal, such as by using a MHP technique to combine the multiple prediction signals. An overall prediction signal may be used to decode the current block of video data by video decoder 300.

Figure 13:
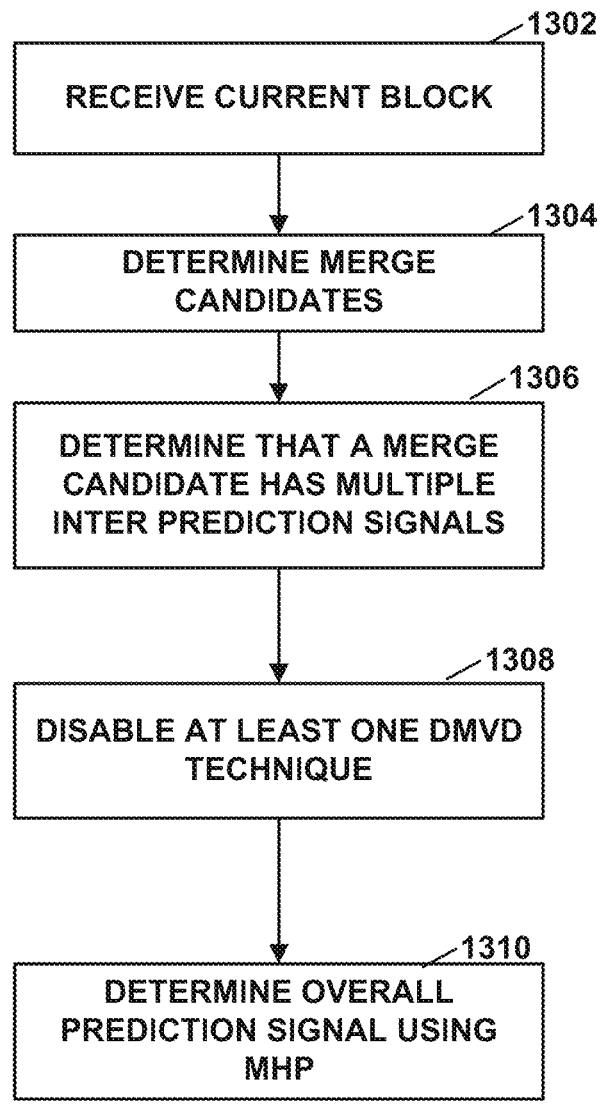
FIG. 13 is a flowchart illustrating an example method for encoding a current block in accordance with the techniques of this disclosure.

Video encoder 200 may be configured to perform the method shown in FIG. 13. In particular, at 1302, a current block of video data to be encoded is received by motion estimation unit 222. At 1304, motion estimation unit 222 determines merge candidates for the block of video data, such as by using VVC and/or MHP techniques, or the like. At 1304, motion estimation unit 222 determines if a merge candidate includes a base prediction signal and at least one additional inter prediction signal. At 1308, if at least one additional inter prediction signal exists, then at least one decoder side motion vector derivation technique is disabled for use on the base prediction signal. At 1310, motion estimation unit 222 determines an overall prediction signal, such as by using a MHP technique to combine the multiple prediction signals. Video encoder 200 may use the overall prediction signal to encode the current block of video data.

Additional method and devices of the disclosure are described in the following aspects.

Aspect 1A—A method of coding video data, the method comprising: determining merge candidates for a block of video data; determining if a merge candidate of the merge candidate includes an additional hypothesis; and disabling a decoder side motion vector derivation technique for use on a base prediction signal of the block of video data in response to determining that the merge candidate includes the additional hypothesis.

Aspect 2A—The method of Aspect 1A, wherein the additional hypothesis is an inherited additional hypothesis.

Aspect 3A—The method of Aspect 1A, wherein the additional hypothesis is indicated by a syntax element signaled in a video bitstream.

Aspect 4A—The method of Aspect 3A, further comprising: coding the syntax element indicating the additional hypothesis.

Aspect 5A—The method of Aspect 1A, wherein the decoder side motion vector derivation technique is one of bi-directional optical flow or a decoder side motion vector refinement technique.

Aspect 6A—The method of Aspect 5A, wherein the decoder side motion vector refinement technique is a multi-pass decoder side motion vector refinement technique.

Aspect 7A—The method of any of Aspects 1A-6A, wherein coding comprises decoding.

Aspect 8A—The method of any of Aspects 1A-6A, wherein coding comprises encoding.

Aspect 9A—A device for coding video data, the device comprising one or more means for performing the method of any of Aspects 1A-8A.

Aspect 10A—The device of Aspect 9A, wherein the one or more means comprise one or more processors implemented in circuitry.

Aspect 11A—The device of any of Aspects 9A and 10A, further comprising a memory to store the video data.

Aspect 12A—The device of any of Aspects 9A-11A, further comprising a display configured to display decoded video data.

Aspect 13A—The device of any of Aspects 9A-12A, wherein the device comprises one or more of a camera, a computer, a mobile device, a broadcast receiver device, or a set-top box.

Aspect 14A—The device of any of Aspects 9A-13A, wherein the device comprises a video decoder.

Aspect 15A—The device of any of Aspects 9A-14A, wherein the device comprises a video encoder.

Aspect 16A—A computer-readable storage medium having stored thereon instructions that, when executed, cause one or more processors to perform the method of any of Aspects 1A-8A.

Aspect 17A—A device for coding video data, the device comprising: means for determining merge candidates for a block of video data; means for determining if a merge candidate of the merge candidate includes an additional hypothesis; and means for disabling a decoder side motion vector derivation technique for use on a base prediction signal of the block of video data in response to determining that the merge candidate includes the additional hypothesis.

Aspect 18A—A method of coding video data, the method comprising: determining merge candidates for a block of video data; determining if a merge candidate of the merge candidate includes an additional hypothesis; and disabling a decoder side motion vector derivation technique for use on a base prediction signal of the block of video data in response to determining that the merge candidate includes the additional hypothesis.

Aspect 19A—The method of Aspect 18A, wherein the additional hypothesis is an inherited additional hypothesis.

Aspect 20A—The method of Aspect 18A, wherein the additional hypothesis is indicated by a syntax element signaled in a video bitstream.

Aspect 21A—The method of Aspect 20A, further comprising: coding the syntax element indicating the additional hypothesis.

Aspect 22A—The method of any of Aspects 18A-21A, wherein the decoder side motion vector derivation technique is one of bi-directional optical flow or a decoder side motion vector refinement technique.

Aspect 23A—The method of any of Aspects 18A-22A, wherein the decoder side motion vector refinement technique is a multi-pass decoder side motion vector refinement technique.

Aspect 24A—The method of any of Aspects 18A-24A, wherein coding comprises decoding.

Aspect 25A—The method of any of Aspects 18A-24A, wherein coding comprises encoding.

Aspect 26A—A device for coding video data, the device comprising one or more means for performing the method of any of Aspects 18A-25A.

Aspect 1B—A method of decoding video data, the method comprising: determining merge candidates for a block of video data; determining if a merge candidate of the merge candidates includes an additional inter prediction signal; and disabling at least one decoder side motion vector derivation technique for use on a base prediction signal of the block of video data in response to determining that the merge candidate includes an additional inter prediction signal.

Aspect 2B—The method of Aspect 1B, wherein the additional inter prediction signal is an inherited additional inter prediction signal.

Aspect 3B—The method of Aspect 1B, wherein the additional inter prediction signal is indicated by a syntax element signaled in a video bitstream related to the block of video data.

Aspect 4B—The method of Aspect 3B, further comprising: decoding the syntax element indicating the additional inter prediction signal.

Aspect 5B—The method of Aspect 1B, wherein the at least one decoder side motion vector derivation technique is one of bi-directional optical flow technique or a decoder side motion vector refinement technique.

Aspect 6B—The method of Aspect 5B, wherein the decoder side motion vector refinement technique is a multi-pass decoder side motion vector refinement technique.

Aspect 7B—The method of Aspect 1B, wherein the at least one decoder side motion vector derivation technique is a bi-directional optical flow technique and a decoder side motion vector refinement technique.

Aspect 8B—The method of Aspect 1B, wherein the at least one decoder side motion vector derivation technique is a first decoder side motion vector derivation technique, the method further comprising enabling a second decoder side motion vector derivation technique that is different than the first decoder side motion vector derivation technique if the second decoder side motion vector derivation technique conditions are met.

Aspect 9B—The method of Aspect 8B, wherein the first decoder side motion vector derivation technique is a bi-directional optical flow technique and the second decoder side motion vector derivation technique is a decoder side motion vector refinement technique.

Aspect 10B—The method of Aspect 8B, wherein the first decoder side motion vector derivation technique is a decoder side motion vector refinement technique and the second decoder side motion vector derivation technique is a bi-directional optical flow technique.

Aspect 11B—The method of Aspect 1B, the method further comprising determining an overall prediction signal with a multiple hypothesis prediction technique using the base prediction signal and the additional inter prediction signal and decoding the video block using the overall prediction signal.

Aspect 12B—The method of Aspect 11B, wherein the multiple hypothesis prediction technique determines a weighted superposition of the base prediction signal and the additional inter prediction signal.

Aspect 13B—The method of Aspect 11B, wherein the multiple hypothesis prediction technique determines a weighted superposition of more than two motion-compensated prediction signals.

Aspect 14B—A device configured to decode video data, the device comprising: a memory configured to store a block of video data; and one or more processors in communication with the memory, the one or more processors configured to: determine merge candidates for the block of video data; determine if a merge candidate of the merge candidates includes an additional inter prediction signal; and disable at least one decoder side motion vector derivation technique for use on a base prediction signal of the block of video data in response to a determination that a merge candidate includes an additional inter prediction signal.

Aspect 15B—The device of Aspect 14B, wherein the additional inter prediction signal is an inherited additional inter prediction signal.

Aspect 16B—The device of Aspect 14B, wherein the additional inter prediction signal is indicated by a syntax element signaled in a video bitstream related to the block of video data.

Aspect 17B—The device of Aspect 16B, wherein the one or more processors are further configured to decode the syntax element indicating the additional inter prediction signal.

Aspect 18B—The device of Aspect 14B, wherein the at least one decoder side motion vector derivation technique is one of bi-directional optical flow technique or a decoder side motion vector refinement technique.

Aspect 19B—The device of Aspect 14B, wherein the decoder side motion vector refinement technique is a multi-pass decoder side motion vector refinement technique.

Aspect 20B—The device of Aspect 14B, wherein the at least one decoder side motion vector derivation technique is a bi-directional optical flow technique and a decoder side motion vector refinement technique.

Aspect 21B—The device of Aspect 14B, wherein the at least one decoder side motion vector derivation technique is a first decoder side motion vector derivation technique, wherein the processors are further configured to enable a second decoder side motion vector derivation technique that is different than the first decoder side motion vector derivation technique if the second decoder side motion vector derivation technique conditions are met.

Aspect 22B—The device of Aspect 21B, wherein the first decoder side motion vector derivation technique is a bi-directional optical flow technique and the second decoder side motion vector derivation technique is a decoder side motion vector refinement technique.

Aspect 23B—The device of Aspect 21B, wherein the first decoder side motion vector derivation technique is a decoder side motion vector refinement technique and the second decoder side motion vector derivation technique is a bi-directional optical flow technique.

Aspect 24B—The device of Aspect 14B, wherein the one or more processors are further configured to determine an overall prediction signal with a multiple hypothesis prediction technique using the base prediction signal and the additional inter prediction signal and configured to decode the video block using the overall prediction signal.

Aspect 25B—The device of Aspect 24B, wherein the multiple hypothesis prediction technique determines a weighted superposition of the base prediction signal and the additional inter prediction signal.

Aspect 26B—The device of Aspect 24B, wherein the multiple hypothesis prediction technique determines a weighted superposition of more than two motion-compensated prediction signals.

Aspect 27B—The device of Aspect 24B, further comprising a display for displaying a picture of video data that includes the block of video data.

Aspect 28B—A device configured to encode video data, the device comprising a memory and one or more processors configured to: determine merge candidates for a block of video data; determine if a merge candidate of the merge candidates includes an additional inter prediction signal; and disable at least one decoder side motion vector derivation technique for use on a base prediction signal of the block of video data in response to a determination that a merge candidate includes an additional inter prediction signal.

Aspect 29B—The device of Aspect 28B, wherein the one or more processors are further configured to determine an overall prediction signal with a multiple hypothesis prediction technique using the base prediction signal and the additional inter prediction signal and configured to encode the video block using the overall prediction signal.

Aspect 30B—The device of Aspect 29B, wherein the multiple hypothesis prediction technique determines a weighted superposition of the base prediction signal and the additional inter prediction signal.

Aspect 1C—A method of decoding video data, the method comprising: determining merge candidates for a block of video data; determining if a merge candidate of the merge candidates includes an additional inter prediction signal; and disabling at least one decoder side motion vector derivation technique for use on a base prediction signal of the block of video data in response to determining that the merge candidate includes an additional inter prediction signal.

Aspect 2C—The method of Aspect 1C, wherein the additional inter prediction signal is an inherited additional inter prediction signal.

Aspect 3C—The method of Aspect 1C, wherein the additional inter prediction signal is indicated by a syntax element signaled in a video bitstream related to the block of video data.

Aspect 4C—The method of Aspect 3C, further comprising: decoding the syntax element indicating the additional inter prediction signal.

Aspect 5C—The method of any of Aspects 1C-4C, wherein the at least one decoder side motion vector derivation technique is one of bi-directional optical flow technique or a decoder side motion vector refinement technique.

Aspect 6C—The method of Aspect 5C, wherein the decoder side motion vector refinement technique is a multi-pass decoder side motion vector refinement technique.

Aspect 7C—The method of any of Aspects 1C-4C, wherein the at least one decoder side motion vector derivation technique is a bi-directional optical flow technique and a decoder side motion vector refinement technique.

Aspect 8C—The method of any of Aspects 1C-4C, wherein the at least one decoder side motion vector derivation technique is a first decoder side motion vector derivation technique, the method further comprising enabling a second decoder side motion vector derivation technique that is different than the first decoder side motion vector derivation technique if the second decoder side motion vector derivation technique conditions are met.

Aspect 9C—The method of Aspect 8C, wherein the first decoder side motion vector derivation technique is a bi-directional optical flow technique and the second decoder side motion vector derivation technique is a decoder side motion vector refinement technique.

Aspect 10C—The method of Aspect 8C, wherein the first decoder side motion vector derivation technique is a decoder side motion vector refinement technique and the second decoder side motion vector derivation technique is a bi-directional optical flow technique.

Aspect 11C—The method of any of Aspects 1C-10C, the method further comprising determining an overall prediction signal with a multiple hypothesis prediction technique using the base prediction signal and the additional inter prediction signal and decoding the video block using the overall prediction signal.

Aspect 12C—The method of Aspect 11C, wherein the multiple hypothesis prediction technique determines a weighted superposition of the base prediction signal and the additional inter prediction signal.

Aspect 13C—The method of Aspect 11C, wherein the multiple hypothesis prediction technique determines a weighted superposition of more than two motion-compensated prediction signals.

Aspect 14C—A device configured to decode video data, the device comprising: a memory configured to store a block of video data; and one or more processors in communication with the memory, the one or more processors configured to: determine merge candidates for the block of video data; determine if a merge candidate of the merge candidates includes an additional inter prediction signal; and disable at least one decoder side motion vector derivation technique for use on a base prediction signal of the block of video data in response to a determination that a merge candidate includes an additional inter prediction signal.

Aspect 15C—The device of Aspect 14C, wherein the additional inter prediction signal is an inherited additional inter prediction signal.

Aspect 16C—The device of Aspect 14C, wherein the additional inter prediction signal is indicated by a syntax element signaled in a video bitstream related to the block of video data.

Aspect 17C—The device of Aspect 16C, wherein the one or more processors are further configured to decode the syntax element indicating the additional inter prediction signal.

Aspect 18C—The device of any of Aspects 14C-17C, wherein the at least one decoder side motion vector derivation technique is one of bi-directional optical flow technique or a decoder side motion vector refinement technique.

Aspect 19C—The device of any of Aspects 14C-17C, wherein the decoder side motion vector refinement technique is a multi-pass decoder side motion vector refinement technique.

Aspect 20C—The device of any of Aspects 14C-17C, wherein the at least one decoder side motion vector derivation technique is a bi-directional optical flow technique and a decoder side motion vector refinement technique.

Aspect 21C—The device of any of Aspects 14C-17C, wherein the at least one decoder side motion vector derivation technique is a first decoder side motion vector derivation technique, wherein the processors are further configured to enable a second decoder side motion vector derivation technique that is different than the first decoder side motion vector derivation technique if the second decoder side motion vector derivation technique conditions are met.

Aspect 22C—The device of Aspect 21C, wherein the first decoder side motion vector derivation technique is a bi-directional optical flow technique and the second decoder side motion vector derivation technique is a decoder side motion vector refinement technique.

Aspect 23C—The device of Aspect 21C, wherein the first decoder side motion vector derivation technique is a decoder side motion vector refinement technique and the second decoder side motion vector derivation technique is a bi-directional optical flow technique.

Aspect 24C—The device of any of Aspects 14C-23C, wherein the one or more processors are further configured to determine an overall prediction signal with a multiple hypothesis prediction technique using the base prediction signal and the additional inter prediction signal and configured to decode the video block using the overall prediction signal.

Aspect 25C—The device of Aspect 24C, wherein the multiple hypothesis prediction technique determines a weighted superposition of the base prediction signal and the additional inter prediction signal.

Aspect 26C—The device of Aspect 24C, wherein the multiple hypothesis prediction technique determines a weighted superposition of more than two motion-compensated prediction signals.

Aspect 27C—The device of Aspect 24C, further comprising a display for displaying a picture of video data that includes the block of video data.

Aspect 28C—A device configured to encode video data, the device comprising a memory and one or more processors configured to: determine merge candidates for a block of video data; determine if a merge candidate of the merge candidates includes an additional inter prediction signal; and disable at least one decoder side motion vector derivation technique for use on a base prediction signal of the block of video data in response to a determination that a merge candidate includes an additional inter prediction signal.

Aspect 29C—The device of Aspect 28C, wherein the one or more processors are further configured to determine an overall prediction signal with a multiple hypothesis prediction technique using the base prediction signal and the additional inter prediction signal and configured to encode the video block using the overall prediction signal.

Aspect 30C—The device of Aspect 29C, wherein the multiple hypothesis prediction technique determines a weighted superposition of the base prediction signal and the additional inter prediction signal.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining merge candidates for a block of video data;
   determining if a merge candidate of the merge candidates includes a base prediction signal and an additional inter prediction signal;
   disabling at least one decoder side motion vector derivation technique for use on the base prediction signal of the block of video data based on determining that the merge candidate includes the additional inter prediction signal, wherein the at least one decoder side motion vector derivation technique comprises a multi-pass decoder side motion vector refinement technique;
   determining an overall prediction signal with a multiple hypothesis prediction technique using the base prediction signal and the additional inter prediction signal; and
   decoding the block of video data using the overall prediction signal.

2. The method of claim 1, wherein the additional inter prediction signal is an inherited additional inter prediction signal.

3. The method of claim 1, wherein the additional inter prediction signal is indicated by a syntax element signaled in a video bitstream related to the block of video data.

4. The method of claim 3, further comprising:
   decoding the syntax element indicating the additional inter prediction signal.

5. The method of claim 1, wherein the at least one decoder side motion vector derivation technique is a bi-directional optical flow technique and a decoder side motion vector refinement technique.

6. The method of claim 1, wherein the multiple hypothesis prediction technique determines a weighted superposition of the base prediction signal and the additional inter prediction signal.

7. The method of claim 1, wherein the multiple hypothesis prediction technique determines a weighted superposition of more than two motion-compensated prediction signals.

8. A device configured to decode video data, the device comprising:
   a memory configured to store a block of video data; and
   one or more processors in communication with the memory, the one or more processors configured to:
      determine merge candidates for the block of video data;
      determine if a merge candidate of the merge candidates includes a base prediction signal and an additional inter prediction signal;
      disable at least one decoder side motion vector derivation technique for use on the base prediction signal of the block of video data based on the determination that the merge candidate includes the additional inter prediction signal, wherein the at least one decoder side motion vector derivation technique comprises a multi-pass decoder side motion vector refinement technique;
      determine an overall prediction signal with a multiple hypothesis prediction technique using the base prediction signal and the additional inter prediction signal; and
      decode the block of video data using the overall prediction signal.

9. The device of claim 8, wherein the additional inter prediction signal is an inherited additional inter prediction signal.

10. The device of claim 8, wherein the additional inter prediction signal is indicated by a syntax element signaled in a video bitstream related to the block of video data.

11. The device of claim 10, wherein the one or more processors are further configured to decode the syntax element indicating the additional inter prediction signal.

12. The device of claim 8, wherein the at least one decoder side motion vector derivation technique is a first decoder side motion vector derivation technique, wherein the processors are further configured to enable a second decoder side motion vector derivation technique that is different than the first decoder side motion vector derivation technique if second decoder side motion vector derivation technique conditions are met.

13. The device of claim 12, wherein the first decoder side motion vector derivation technique is a bi-directional optical flow technique and the second decoder side motion vector derivation technique is a decoder side motion vector refinement technique.

14. The device of claim 12, wherein the first decoder side motion vector derivation technique is a decoder side motion vector refinement technique and the second decoder side motion vector derivation technique is a bi-directional optical flow technique.

15. The device of claim 8, wherein the multiple hypothesis prediction technique determines a weighted superposition of the base prediction signal and the additional inter prediction signal.

16. The device of claim 8, wherein the multiple hypothesis prediction technique determines a weighted superposition of more than two motion-compensated prediction signals.

17. The device of claim 8, further comprising a display for displaying a picture of video data that includes the block of video data.

18. A device configured to decode video data, the device comprising:
- a memory configured to store a block of video data; and
- one or more processors in communication with the memory, the one or more processors configured to:
  - determine merge candidates for the block of video data;
  - determine if a merge candidate of the merge candidates includes a base prediction signal and an additional inter prediction signal;
  - disable at least one decoder side motion vector derivation technique for use on the base prediction signal of the block of video data based on the determination that the merge candidate includes the additional inter prediction signal, wherein the at least one decoder side motion vector derivation technique is a first decoder side motion vector derivation technique, and wherein the processors are further configured to enable a second decoder side motion vector derivation technique that is different than the first decoder side motion vector derivation technique if second decoder side motion vector derivation technique conditions are met;
  - determine an overall prediction signal with a multiple hypothesis prediction technique using the base prediction signal and the additional inter prediction signal; and
  - decode the block of video data using the overall prediction signal.

19. The device of claim 18, wherein the first decoder side motion vector derivation technique is a bi-directional optical flow technique and the second decoder side motion vector derivation technique is a decoder side motion vector refinement technique.

20. The device of claim 18, wherein the first decoder side motion vector derivation technique is a decoder side motion vector refinement technique and the second decoder side motion vector derivation technique is a bi-directional optical flow technique.

* * * * *